(12) United States Patent
Rinker et al.

(10) Patent No.: US 10,178,921 B1
(45) Date of Patent: Jan. 15, 2019

(54) MECHANISMS AND SYSTEMS FOR FILTER SEATING

(71) Applicant: Brita LP, Oakland, CA (US)

(72) Inventors: Edward B. Rinker, Pleasanton, CA (US); Jonathan McDonald, Pleasanton, CA (US)

(73) Assignee: Brita LP, Oakland, CA (US)

( * ) Notice: Subject to any disclaimer, the term of this patent is extended or adjusted under 35 U.S.C. 154(b) by 479 days.

(21) Appl. No.: 14/339,517

(22) Filed: Jul. 24, 2014

Related U.S. Application Data

(60) Provisional application No. 61/893,389, filed on Oct. 21, 2013, provisional application No. 61/862,711, filed on Aug. 6, 2013.

(51) Int. Cl.
*A47G 19/12* (2006.01)
*C02F 1/00* (2006.01)

(52) U.S. Cl.
CPC .............. *A47G 19/12* (2013.01); *C02F 1/003* (2013.01)

(58) Field of Classification Search
None
See application file for complete search history.

(56) References Cited

U.S. PATENT DOCUMENTS

| | | | |
|---|---|---|---|
| 1,861,481 A * | 6/1932 | Rabjohn | C02F 1/003 210/123 |
| 4,969,996 A | 11/1990 | Hankammer | |
| 5,518,620 A | 5/1996 | Eguchi et al. | |
| 5,536,394 A * | 7/1996 | Lund | C02F 1/003 116/273 |
| 5,811,004 A * | 9/1998 | Robertson | C02F 1/003 210/266 |
| 5,980,743 A | 11/1999 | Bairischer | |
| 6,103,114 A | 8/2000 | Tanner et al. | |
| 6,178,290 B1 * | 1/2001 | Weyrauch | C02F 1/003 210/181 |
| 6,254,768 B1 | 7/2001 | Dulieu et al. | |
| 6,348,084 B1 * | 2/2002 | Gieseke | B01D 46/0002 55/357 |
| 6,383,381 B1 | 5/2002 | O'Flynn et al. | |
| 6,638,426 B1 | 10/2003 | Fritter et al. | |
| 8,043,502 B2 | 10/2011 | Nauta | |
| 8,202,418 B2 | 6/2012 | Wallerstorfer et al. | |
| 8,216,465 B2 | 7/2012 | Nauta | |

(Continued)

FOREIGN PATENT DOCUMENTS

| | | |
|---|---|---|
| WO | WO9817582 | 4/1998 |
| WO | WO9832705 | 7/1998 |
| WO | WO14014789 | 1/2014 |

*Primary Examiner* — Benjamin M Kurtz
(74) *Attorney, Agent, or Firm* — Thomas C. Feix

(57) ABSTRACT

In one example, a water pitcher is provide that includes a candle defining a receptacle with a fluid inlet and a fluid outlet and configured to removably receive a filter cartridge. As well, the candle includes a filter seat that cooperates with the filter cartridge to form a substantially fluid-tight seal when the filter cartridge is positioned in a sealing range defined by the candle. A filter management element is configured and arranged so that when the filter cartridge is aligned in the receptacle but resides outside the sealing range, and a force is exerted on the filter management element, the force is transferred to the filter cartridge by way of the filter management element so as to move the filter cartridge into the sealing range.

11 Claims, 28 Drawing Sheets

(56) References Cited

U.S. PATENT DOCUMENTS

| | | |
|---|---|---|
| 8,388,841 B2 | 3/2013 | Moretto |
| 2003/0159979 A1* | 8/2003 | Chau .................... A47J 31/605 |
| | | 210/282 |
| 2004/0173507 A1* | 9/2004 | Tanner ................... C02F 1/003 |
| | | 210/85 |
| 2006/0000763 A1 | 1/2006 | Rinker et al. |
| 2006/0162806 A1* | 7/2006 | Hengsperger ......... A47J 31/605 |
| | | 141/18 |
| 2010/0187168 A1* | 7/2010 | Moretto ................. C02F 1/003 |
| | | 210/86 |
| 2010/0307986 A1 | 12/2010 | Alexandrou |

* cited by examiner

Convex Top

Concave Top

Flat Top

MECHANISMS AND SYSTEMS FOR FILTER SEATING

RELATED APPLICATIONS

This application hereby claims priority to: U.S. Provisional Patent Application Ser. 61/862,711, entitled FILTER RETAINING FLUME, and filed Aug. 6, 2013; and, U.S. Provisional Patent Application Ser. 61/893,389, entitled PROTRUSION-FILTER SYSTEM, and filed Oct. 21, 2013. All of the aforementioned applications are incorporated herein in their respective entireties by this reference.

This application is related to the following United States Patent Applications, all of which are filed the same day herewith and incorporated herein in their respective entireties by this reference: U.S. patent application Ser. No. 14/339,521, entitled INTERMEDIATE ADAPTER FOR FILTER SEATING; U.S. patent application Ser. No. 14/339,528, entitled METHODS AND SYSTEMS FOR DIRECTING FLUID FLOW IN A CONTAINER; and, U.S. patent application Ser. No. 14/339,535, entitled WATER PITCHER SYSTEM.

FIELD OF THE INVENTION

Embodiments of the present invention generally concern water filtration systems for pitchers and other fluid containers. More particularly, embodiments of the invention relate to devices for seating, aligning, and/or retaining a filter element in a reservoir or other container which is configured to direct water through a filter element.

BACKGROUND

Water filtration has become common in homes, offices and other places to produce cleaner and better tasting water. One popular filtration system is used in conjunction with a water pitcher. Some water pitchers include an upper chamber for holding untreated water and a lower chamber for holding treated water that has exited the upper chamber. A filter cartridge is placed in a fluid path between the two chambers so that untreated water exits the upper chamber through the filter cartridge and enters the lower chamber as filtered water.

The filter cartridge includes openings that allow unfiltered water to enter the interior of the filter cartridge where the unfiltered water comes into contact with a filtering medium that acts to remove contaminants from the water as the water flows through the interior of the filter cartridge. After filtering is completed, the filtered water exits the filter cartridge into the lower chamber. As a result, treated water is available and ready to be poured from the water pitcher for consumption by a user.

The filter cartridge typically resides in a receptacle defined by a candle that is located at the bottom of the upper chamber and that is open to both the upper and lower chambers. Absent the filter cartridge, water can flow from the upper chamber to the lower chamber by way of the candle. With proper alignment and seating of the filter cartridge within the candle, water can only flow from the upper chamber to the lower chamber through the filter cartridge. Typically, the filter cartridge is removable so that after the usable life of the cartridge, it may be removed and replaced with a new filter cartridge.

Placement of the filter cartridge within the candle of the water pitcher is important for proper water treatment. In order to place the cartridge, the user typically must maneuver the filter cartridge so that the filter cartridge is firmly seated and properly aligned within the candle. If the filter cartridge is properly aligned and seated within the candle, a fluid tight seal, or substantially fluid tight seal, is formed between the candle and the exterior of the filter cartridge such that water can only flow from the upper chamber to the lower chamber through the filter cartridge.

In practice however, achievement of proper seating of the filter cartridge has proven problematic. This is due at least in part to the construction of typical water pitchers and, more particularly, the relation between various elements of the water pitcher.

For example, one problem is that proper alignment and seating of the filter cartridge in the candle requires focused effort on the part of the user. That is, proper alignment and seating of the filter cartridge generally cannot be achieved by simply dropping the filter cartridge into the candle. Instead, the user must perform an extra action to properly align the filter cartridge with respect to the candle, and then seat the filter cartridge within the candle.

In particular, after aligning the filter cartridge so that it can be received within the candle with the proper angular orientation, the user must also push the filter cartridge downward into the candle so that a fluid tight seal, or substantially fluid tight seal, is formed between the filter cartridge and the filter seat in the candle. Users often neglect to perform this necessary step and, as a result, the filter cartridge may be aligned but not properly seated, even though it can appear so to the user. This problem is further aggravated by the fact that typical filtration systems lack any sort of feedback mechanism that indicates to the user that the filter cartridge is properly seated.

Misalignment and/or improper seating of the filter cartridge, as described above, can present a variety of problems with respect to the operation of the filtration system. Among other things, misalignment and/or improper seating of the filter cartridge can result in a gap between the filter cartridge and the filter seat, thus allowing untreated water to bypass the interior of the filter cartridge and flow into the lower chamber, thereby introducing contaminants into the water held in the lower chamber.

Another problem with many filtration systems is that even if the filter cartridge is initially placed in the correct alignment and is properly seated in the candle, the filter cartridge may not be reliably retained in that position. For example, the filter cartridge can move out of position as a result of repeated use of the water pitcher, such as when the water pitcher is tipped to pour treated water from the lower chamber. That is, the tipping motion may act to change the position of the filter cartridge relative to the candle. Moreover, repeated tipping may also cause the filter cartridge to move partly, or completely, out of the candle.

In either case, the seal between the exterior of the filter cartridge and the candle has been compromised. Consequently, the next time the upper chamber is filled, untreated water can bypass the filter cartridge and flow directly into the lower chamber, thus contaminating the filtered water in the lower chamber.

In light of problems such as those noted above, it would be useful to provide a device that ensures proper seating of a filter cartridge that is placed within a water pitcher. As well, it would be useful for the device to maintain the alignment and seating of the filter cartridge, once properly positioned, during use of the pitcher, or other device, that includes the filter cartridge.

SUMMARY OF AN EXAMPLE EMBODIMENT

One or more embodiments within the scope of the invention may be effective in overcoming one or more of the disadvantages in the art. One example embodiment is directed to a water pitcher that includes a filter management element that helps to ensure proper seating of a filter cartridge, and also helps to maintain the filter cartridge alignment and seating during use of the water pitcher.

The water pitcher includes a candle in which a filter cartridge can be removably positioned. A filter seat is provided within the candle to interface with the filter cartridge in such a way that a seal is established between the filter cartridge and the seat. The candle is configured and arranged for fluid communication with both an untreated water reservoir, and a treated water reservoir, of the water pitcher so that water exiting the untreated water reservoir is able to pass through the filter cartridge, when present in the candle, and enter the treated water reservoir.

A filter management element is also provided within the water pitcher and is generally configured and arranged to exert a force on the filter cartridge in a direction and magnitude such that, if the filter cartridge is not already properly seated on the filter seat, the filter cartridge will be moved into a sealing contact with the filter seat. In some instances, multiple filter management elements may be employed.

Moreover, the filter management element may directly contact the filter cartridge, although that is not required and, alternatively, one or more intervening structures can be used to transfer a force exerted by the filter management element to the filter cartridge. Where one or more such intervening structures are present, the filter management element is considered to be in indirect contact with the filter cartridge. The filter management element can take any form or configuration consistent with its function and so is not constrained to any particular form or configuration. Even if an intervening structure is not present, the filter management element is not required to be in contact with the filter cartridge at all times.

In this example embodiment, the filter management element is positioned between a cover of the water pitcher and the top of the filter cartridge, such as by attachment to the cover for example, so that when a user moves the cover to its fully closed position, the cover exerts a force, either directly or indirectly, on the filter management element that is then transferred by the filter management element to the filter cartridge. The exertion of this force moves the filter cartridge into sealing contact with the filter seat in the candle.

Thus, assurance is provided to the user that when the cover is fully closed, the filter cartridge is properly seated and, as such, unfiltered water cannot bypass the filter. In connection with this embodiment, one or more components of the water pitcher can be configured to provide sensory feedback to the user so that the user can ascertain proper seating of the filter cartridge. For example, the cover can include structures that engage complementary structures on the chassis of the pitcher so that a snap sound is produced when the cover is moved to its fully closed position. This cover configuration can also help to ensure that the cover remains closed, thereby maintaining the filter cartridge in the correct position and alignment, even when the water pitcher is tipped.

The foregoing embodiment is provided solely by way of example and is not intended to limit the scope of the invention in any way. Consistently, various other embodiments of filter management elements and associated filters and containers, within the scope of the invention are disclosed herein.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 6b is a view of an inverted cover that includes the example filter management element of FIG. 6a;

DETAILED DESCRIPTION OF SOME EXAMPLE EMBODIMENTS

Figure 1A:
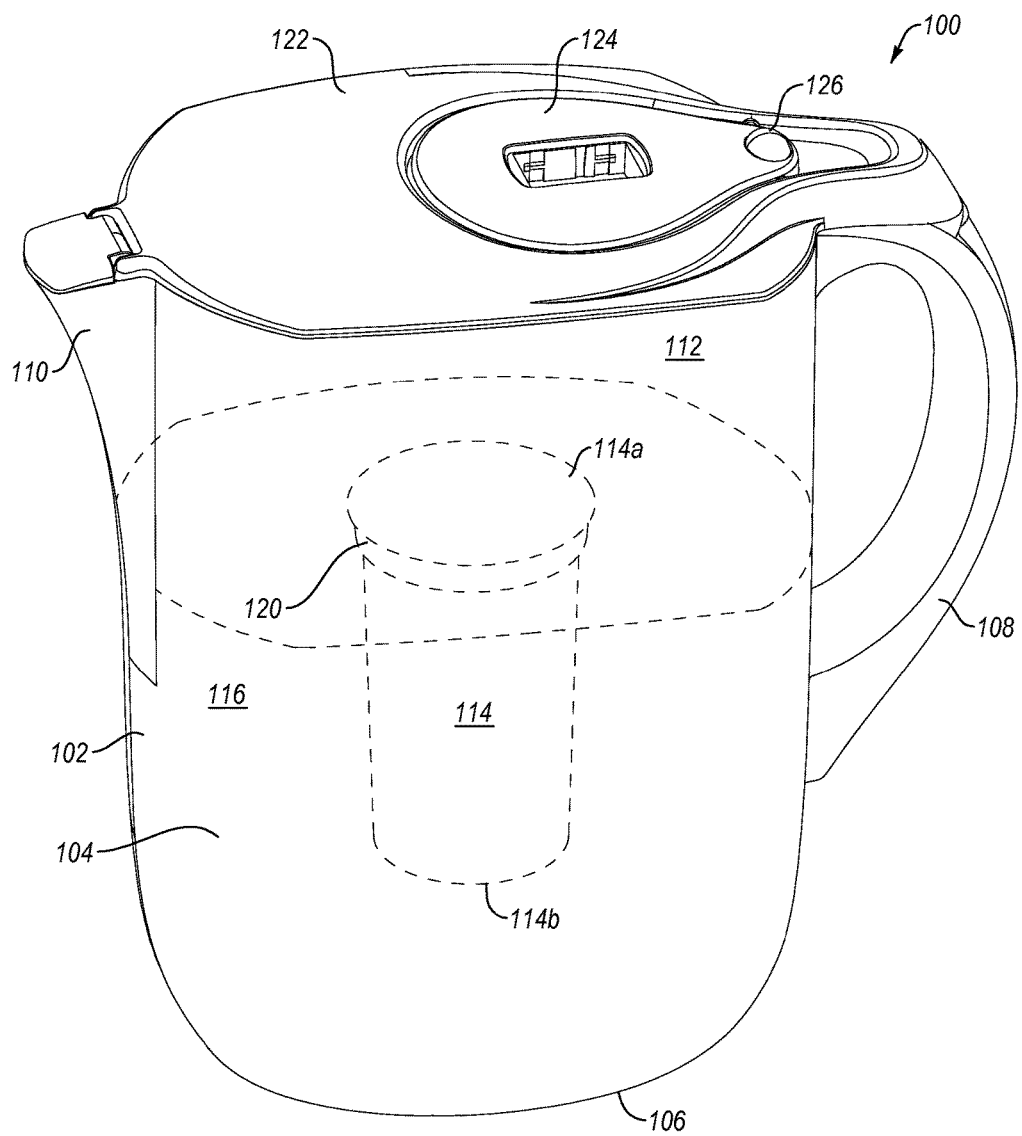
FIG. 1a is a perspective view of an example embodiment in the form of a water pitcher.

Reference will now be made in detail to aspects of various embodiments of the present disclosure, examples of which are illustrated in the accompanying drawings. While described in conjunction with these embodiments, it will be understood that they are not intended to limit the disclosure to these embodiments.

In general, embodiments of the invention can be employed in a variety of different environments, one example of which is a water pitcher, although the scope of the invention is not limited to this example environment and extends, more generally, to any environment where such embodiments can be usefully employed. For example, embodiments of the invention can be employed with any water, or other fluid, container where it is desired to enable a user to reliably align, seat and/or retain a filter cartridge. Examples of such containers include, but are not limited to, water bottles, carafes, and jugs.

A. Example Pitcher Configuration

Directing attention now to FIGS. 1a-1c, and FIG. 2, details are provided concerning an example embodiment in the form of a water pitcher 100. The water pitcher 100 includes a chassis 102 that defines an interior 104. The chassis 102 can be any suitable size or shape. The chassis 102 includes, or is attached to, a base 106. A handle 108 attached to, or integrally formed with, the chassis 102 enables a user to grasp and operate the water pitcher 100. Opposite the handle 108, a spout 110 is provided that is in fluid communication with the interior 104 of the chassis 102. In some embodiments, the chassis 102, base 106, handle 108 and spout 110 are integral with each other and thus have a unitary one-piece construction, which may be constructed of plastic and/or other suitable materials.

An untreated water reservoir 112 is removably disposed in the interior 104 of the chassis 102. In at least some embodiments, the untreated water reservoir 112 is configured to be removably received in a corresponding recess 102a (FIG. 2) defined by the chassis 102 and which serves to support the untreated water reservoir 112. The inside dimension of the recess 102a may be substantially the same as the exterior dimension of the untreated water reservoir 112, such that the untreated water reservoir 112 fits closely within the recess 102a. Thus positioned, and as indicated in FIGS. 1 and 2, the untreated water reservoir 112 occupies a portion of the interior 104 of the chassis 102. In general, the untreated water reservoir 112 serves to receive, and hold for a period of time, water from an external source.

As further indicated in FIGS. 1 and 2, the untreated water reservoir 112 includes a hollow candle 114 that defines a receptacle within which a filter cartridge 113 (FIG. 2), comprising a granular and/or other filtering medium such as ion exchange resin (IER), can be removably positioned. The candle 114 is open at its upper end 114a and lower end 114b and, as such, is in fluid communication with the untreated water reservoir 112, as well as with a treated water reservoir 116 that comprises a portion of the overall interior 104 of the chassis 102. In general, the upper end 114a serves as a fluid inlet, and the lower end 114b serves as a fluid outlet. A seat 120 positioned near the upper end 114a of the candle 114 is configured to cooperate with the filter cartridge 113 in the candle 114 to form a seal such that water in the untreated water reservoir 112 can enter the treated water reservoir 116 only by passing through the filter cartridge 113, as best indicated in FIG. 2. It should be noted that while the gap between the filter cartridge 113 and the candle 114 indicated in FIG. 2 is solely for the purpose of clarity in showing the relation between the filter cartridge 113 and the candle 114, the gap also illustrates the bypass problem that can occur if the filter cartridge 113 is not properly aligned in the candle 114, and seated on the seat 120.

The example water pitcher 100 also includes a cover 122, different embodiments of which can mate with various other elements of the water pitcher 100, in a variety of different ways. For example, in some embodiments, the cover 122 simply rests on the chassis 102, but is not connected to the chassis 102, while in other embodiments, the cover 122 can be removably connected to the untreated water reservoir 112. In either case, a flange 123 of the cover 122 may reside on a surface 103 that is defined by one or both of the top edge 102b of the chassis 102, and a top edge 112a of the untreated water reservoir 112, where the respective top edges 102b and 112a may be substantially flush with each other, as indicated in FIG. 1b for example.

Where the cover 122 is configured to be removably attached to the untreated water reservoir 112, a variety of structures can be employed to this end. In at least some embodiments, the cover 122 and untreated water reservoir 112 include respective complementary structures that releasably engage each other so that the cover 122 and untreated water reservoir 112 can be securely connected to each other, but detached from each other when desired. In light of the foregoing, it will be appreciated that the example complementary structures disclosed herein are example structural implementations of a means for removably attaching the cover 122 and the untreated water reservoir 112 to each other. Any other structure(s) capable of providing comparable functionality can alternatively be employed and are considered as being within the scope of the invention.

Figure 1B:
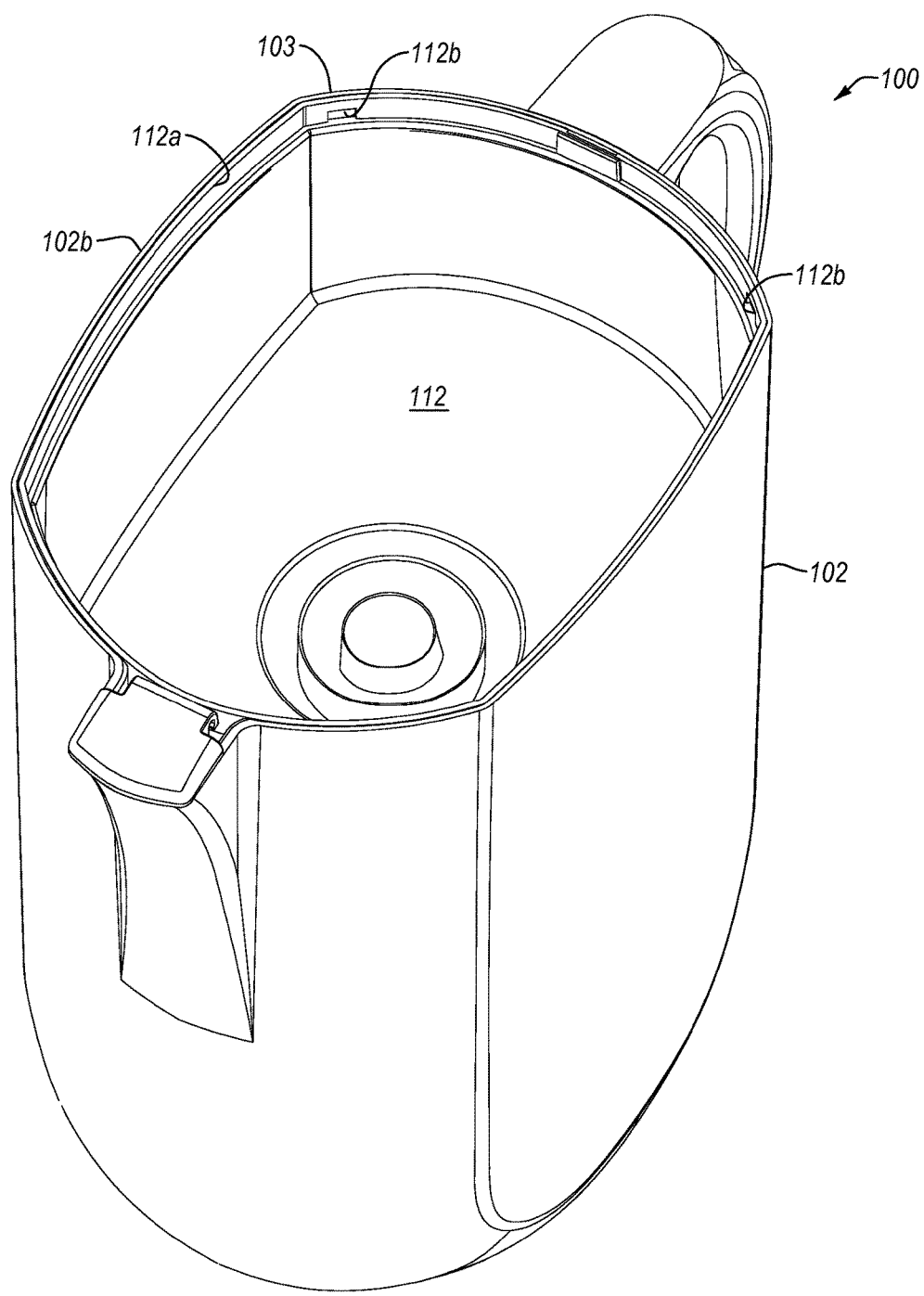
FIG. 1b is a top perspective view of an example pitcher and untreated water reservoir.
Figure 1C:
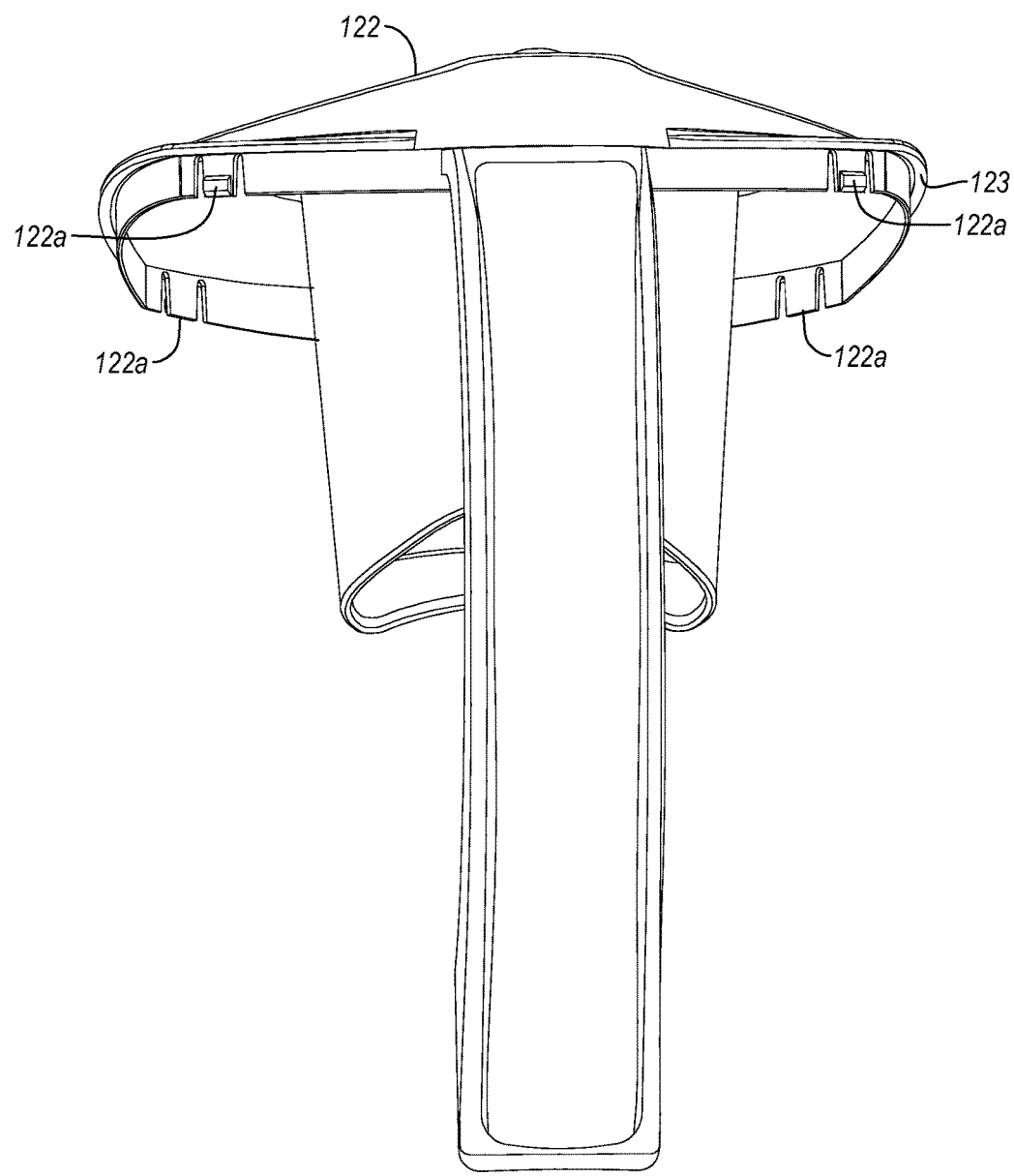
FIG. 1c is a perspective view of an example cover.
Figure 1D:
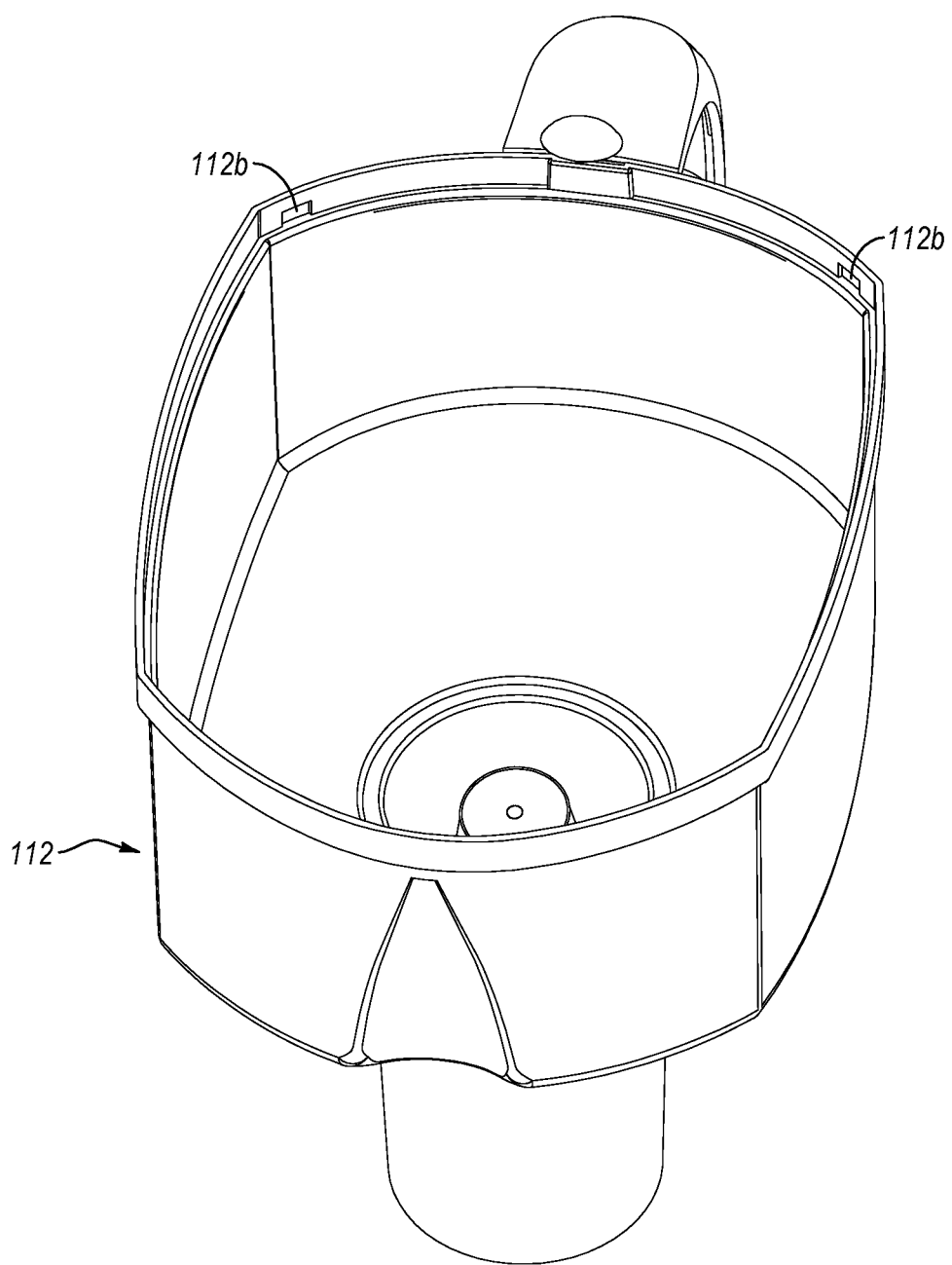
FIG. 1d is a perspective view of an example untreated water reservoir configured to releasably connect to a cover.
Figure 2:
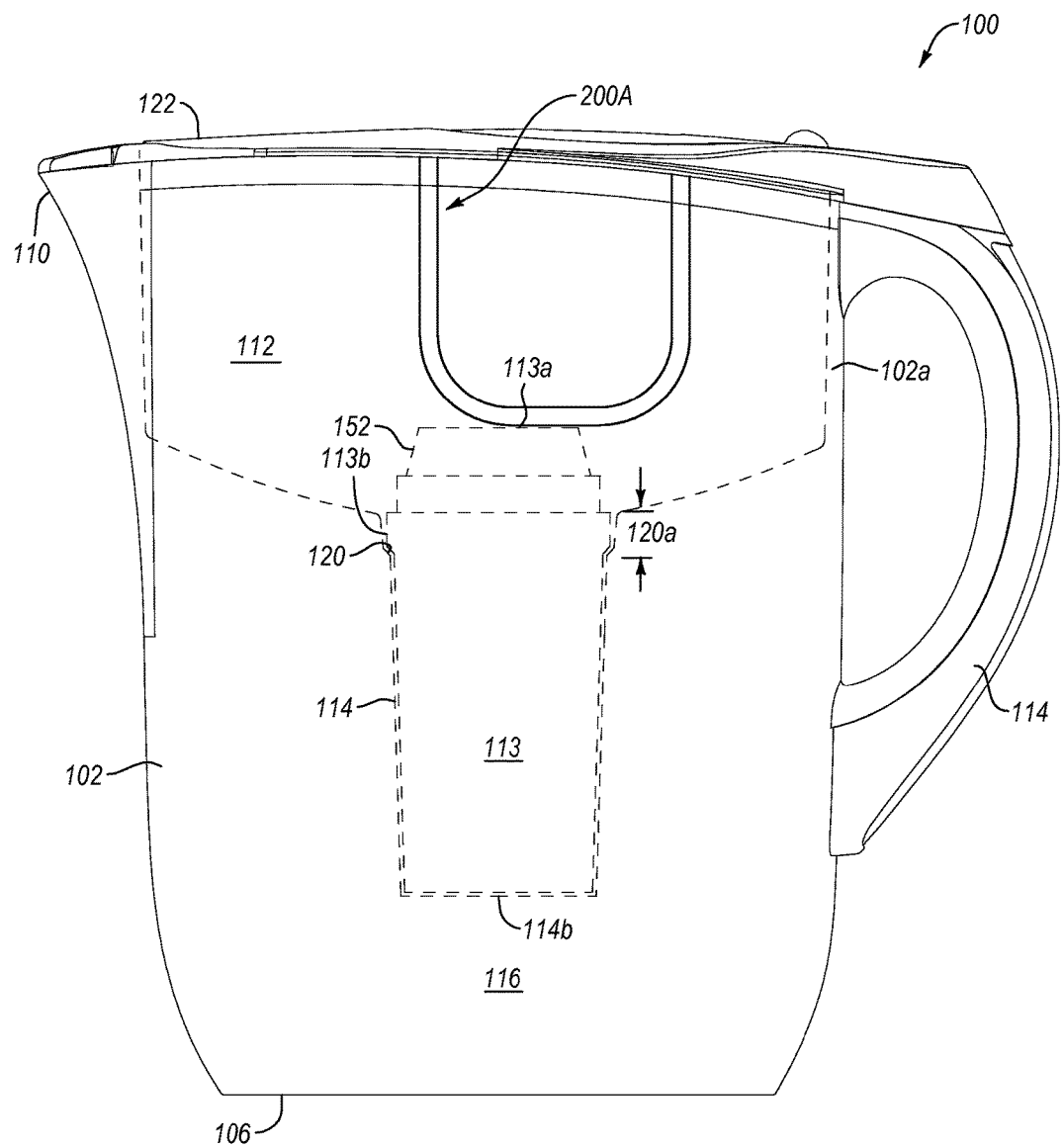
FIG. 2 is a cutaway view of an example pitcher.
Figure 3A:
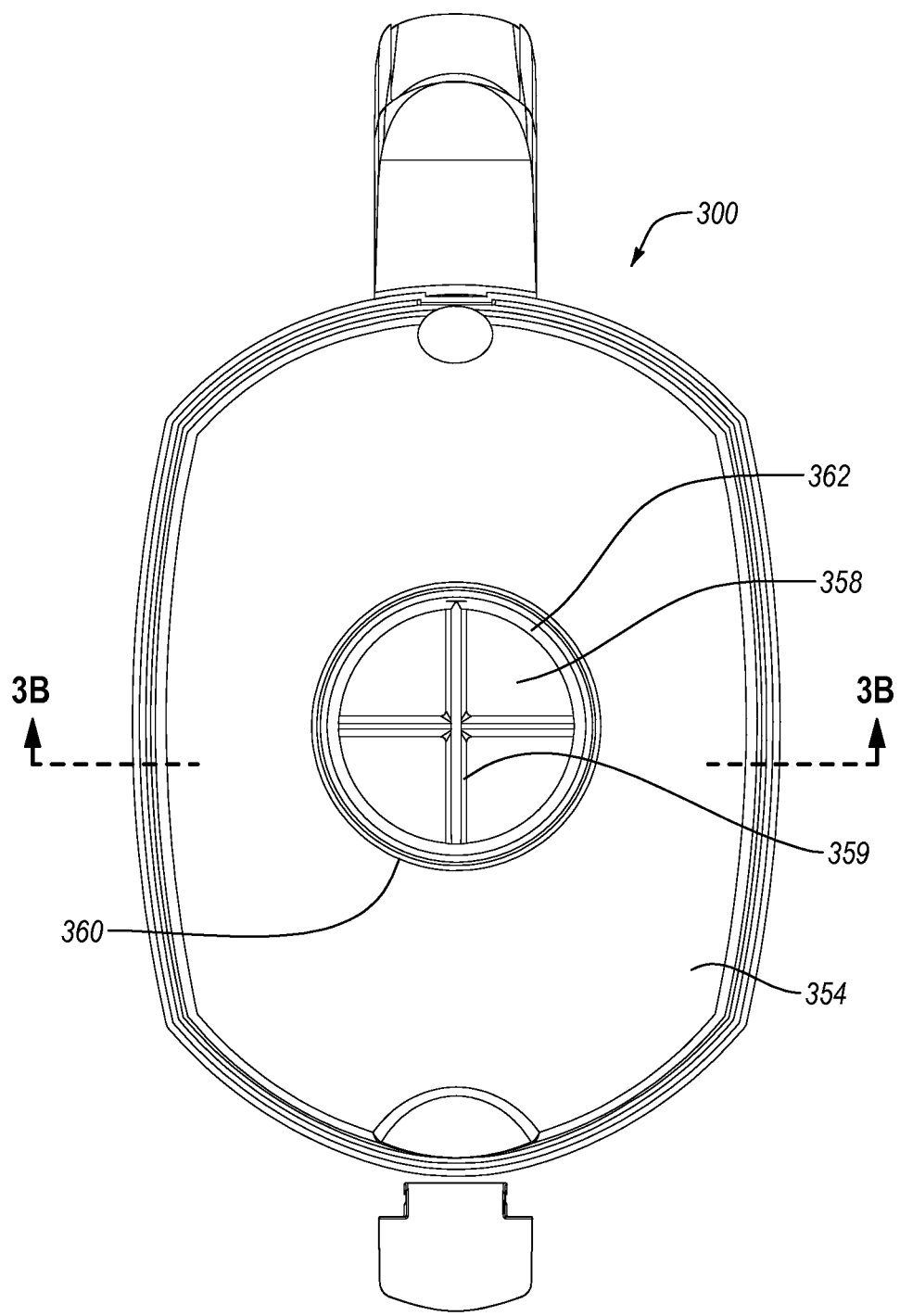
FIG. 3a is a top view of a portion of an untreated water reservoir that includes a filter seat.
Figure 3B:
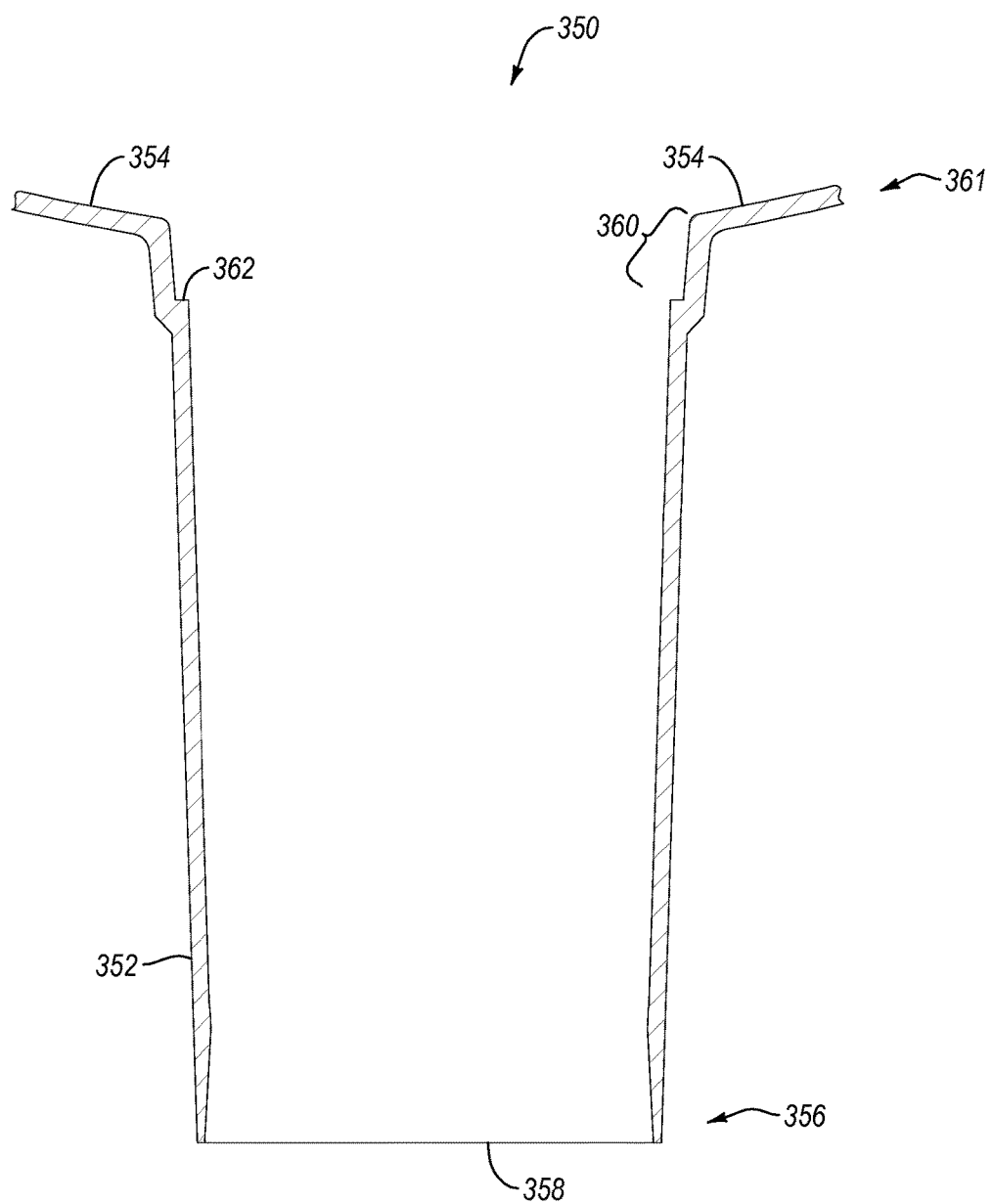
FIG. 3b is a section view taken from FIG. 3a and disclosing aspects of a candle of an untreated water reservoir.
Figure 3C:
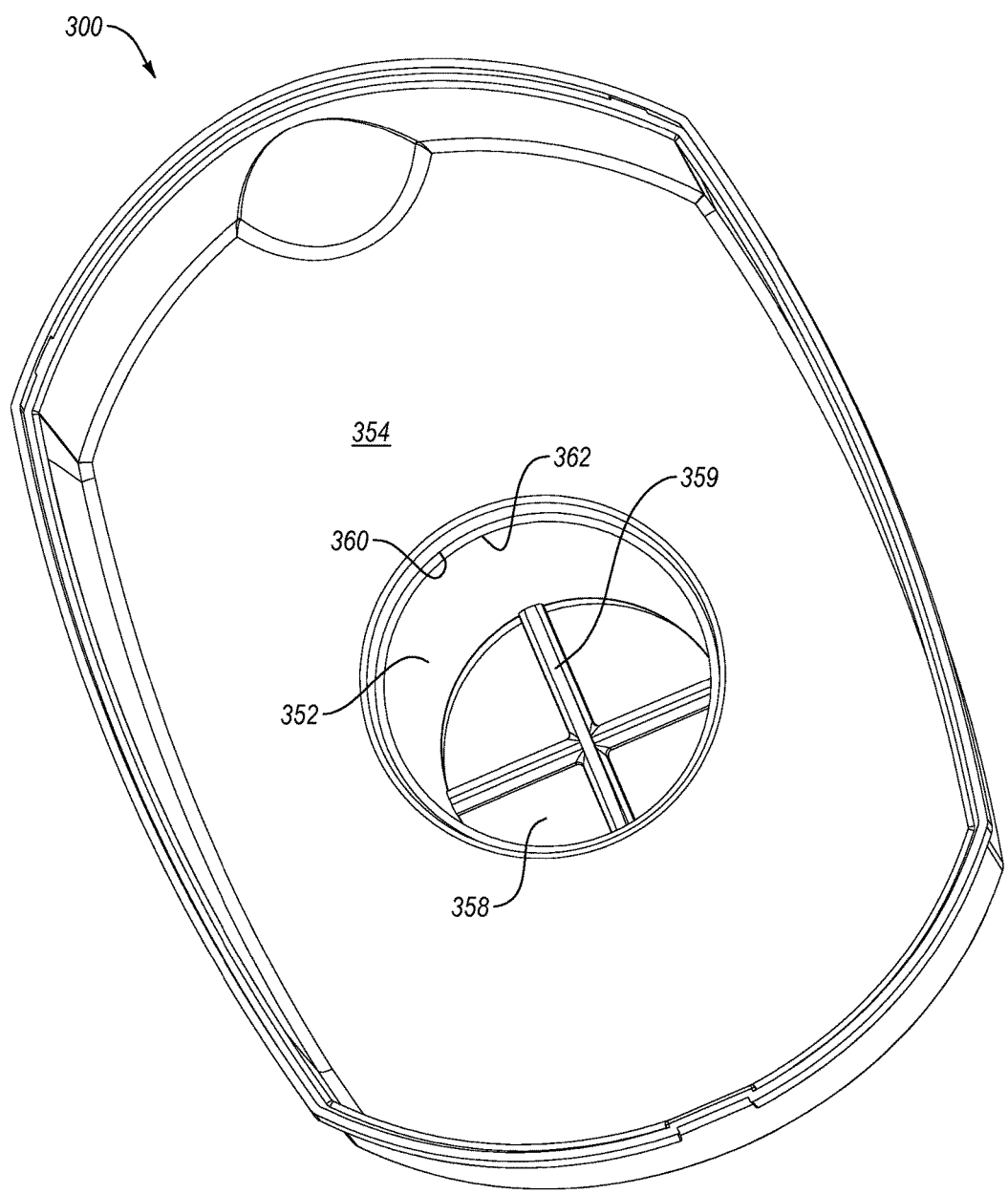
FIG. 3c is a perspective view of a portion of an untreated water reservoir that includes a filter seat.

As best shown in FIGS. 1b-1d, the aforementioned complementary structures can take the form, for example, of one or more tabs 122a of the cover 122 that are configured to snap into respective detents 112b of the untreated water reservoir 112. As indicated in FIG. 1c, each tab 122a may have a free end that can be temporarily deflected so as to move into a corresponding detent 112b. To free the cover 122 from the untreated water reservoir 112, the free ends of the tabs 122a can be deflected sufficiently far that the tab 122a can move out of its respective detent 112b.

As best indicated in FIGS. 1a and 2, the cover 122 extends over the untreated water reservoir 112 so that water does not escape from the untreated reservoir 112 when the water pitcher 100 is tilted. The cover 122 may also include a lid 124 rotatably connected to the cover 122 by way of a hinge 126. In operation, the lid 124 can be opened so that a user can pour water into the untreated water reservoir 112. In some embodiments, the lid 124 and hinge 126 can be omitted, and water poured into the untreated water reservoir 112 with the cover 122 removed.

B. Some Aspects of Example Filter Management Elements

With continued attention to FIG. 2, and directing attention as well to FIGS. 3a-3c and FIG. 4, aspects of a filter management element, one example of which is denoted at 200a, are disclosed. It should be noted at the outset that the scope of the invention is not limited to the particular configuration, arrangement, and orientation of the filter management element 200a indicated in FIG. 2. Rather, this particular filter management element 200a is provided as an example for illustrating various concepts underlying the general notion of a filter management element. Consistent with the foregoing, a variety of other example filter management elements having various configurations, arrangements, and orientations are disclosed elsewhere herein. Examples of such alternate seating elements include those referred to as constituting a "protrusion" in the United States provisional applications referenced, and incorporated, herein.

In general, and as discussed in more detail below, filter management elements, such as the example filter management element 200a of FIG. 2, may be provided within a fluid container, such as a water pitcher for example, and are generally configured and arranged to align, seat, and/or retain, in any combination, a filter cartridge.

In the example embodiment of FIG. 2, the filter management element 200a can exert a force on the filter cartridge in a direction and magnitude such that, if the filter cartridge is not already properly seated on the filter seat, the filter cartridge will be moved into a sealing contact with the filter seat, although other embodiments of a filter management element may perform additional, or alternative, functions. In some instances, multiple filter management elements may be employed. Moreover, the filter management element may directly contact the filter cartridge, although that is not required and, alternatively, one or more intervening structures can be used to transfer a force exerted by the filter management element to the filter cartridge. As noted above, the filter management element can take any form or configuration consistent with its function and so is not constrained to any particular form or configuration, nor location relative to the filter cartridge. Finally, at least some embodiments of the filter management element are configured so as to substantially occupy a gap that would otherwise exist between a cover of the water pitcher and the top of the filter cartridge when the filter cartridge is in and/or out of a sealing range.

In the example embodiment of FIG. 2, the filter management element 200a is positioned between the cover 122 of the water pitcher 100 and the top 113a of the filter cartridge 113. The filter management element 200a may be attached, either permanently or removably, to the cover 122 for example, so that when a user places the cover 122 in the fully closed position indicated in FIG. 2, the cover 122 exerts a force, either directly or indirectly, on the filter management element 200a that is then transferred by the filter management element 200a to the top 113a of the filter cartridge 113. The exertion of this force moves the filter cartridge 113 into sealing contact with the filter seat 120, which can by defined by a recess.

The filter management element 200a may remain in contact with the filter cartridge 113 even after the filter cartridge 113 is properly aligned and seated. This contact can be maintained, for example, by retaining the cover 122 in the fully closed position indicated in FIG. 2. One useful aspect of this arrangement is that the filter cartridge 113 remains properly aligned and seated even when the water pitcher 100 is tipped. Thus, the user need not be concerned with bypass that could result if the filter cartridge 113 were to become misaligned or unseated.

Moreover, embodiments of the invention are configured and arranged to provide immediate and unambiguous feedback, such as sensory feedback, to the user if the filter cartridge 113 is not properly seated. With reference to the particular example of FIG. 2, the top of a sealing range 120a, discussed in more detail below in connection with FIG. 4 (see reference 364), corresponds to the uppermost position in the candle 114 that the filter cartridge 113 can occupy that will still permit the cover 122 to be properly positioned or attached relative to the chassis 102. Thus, if the filter cartridge 113 is positioned out of, that is, above, the sealing range 120a, the interposition of the filter management element 200a between the top of the filter cartridge 113 and the cover 122 prevents the cover 122 from being properly positioned on, or attached to, the chassis 102. The inability to position or attach the cover 122 signifies to the user that the filter cartridge 400 is out of position and must be pushed down into the sealing range 120a. As explained above, a downward force can be exerted by the filter management element 200a to this end and/or the user can exert a downward force on the filter cartridge 113 manually.

Thus, not only is the problem of an improperly positioned filter cartridge immediately visually apparent to the user, but the solution of moving the filter cartridge downward into the sealing range immediately and naturally occurs to the user. This is true even if the user does not necessarily understand that by moving the filter cartridge in this way, a seal between the filter cartridge and the candle is thereby established.

Thus, assurance is provided to the user that when the cover is fully closed, the filter cartridge is properly seated and, as such, unfiltered water cannot bypass the filter. In connection with this and other embodiments, one or more components of the water pitcher can be configured to provide sensory feedback to the user so that the user can ascertain proper seating of the filter cartridge.

For example, the cover can include structures, such as tabs 122a for example, that engage complementary structures, such as detents 112b for example, on the unfiltered water reservoir so that a snap sound is produced when the cover is securely attached to the unfiltered water reservoir. This cover configuration can also help to ensure that the cover remains closed, thereby maintaining the filter cartridge in the correct position and alignment, even when the water pitcher is tipped.

More generally, sensory feedback, which includes any feedback perceptible by one of the senses of a user, can be employed in connection with various embodiments of the invention. Among other things, one or more types of sensory feedback can be used, alone or in combination, to indicate to a user when a filter is properly aligned and/or seated in a candle.

With particular reference now to FIGS. 3a-3c and FIG. 4, further details are provided concerning the relation between an example untreated water reservoir 300 and an example filter cartridge 400.

As noted earlier, a candle 350 may be included as part of the untreated water reservoir 300. In the illustrated example, the candle 350 includes a generally tubular portion 352 that defines a receptacle, which may or may not be tapered to conform with the shape of the filter cartridge 400, that extends vertically downward from a bottom 354 of the untreated water reservoir 300, and the inside diameter of the generally tubular portion 352 is slightly larger than the outside diameter of the filter cartridge 400. The lower end 356 of the candle 350 includes a fluid outlet 358 that allows fluid to exit the candle 350 and enter a treated water reservoir (see, e.g., FIG. 2).

An index structure 359, which can be located in the lower end 356 of the candle 350, can help to ensure proper rotational alignment of the filter cartridge 400 by engaging one or more complementary structures (not shown) on the bottom of the filter cartridge 400. For example, the index structure 359 can be configured with a web 359a that is configured to be received in a corresponding slot 401 of the filter cartridge 400 such that the filter cartridge 400 will only fit into the candle 350 in an orientation in which the web 359a is received in the slot 401.

An annular filter seat 360 is provided at an upper end 361 of the candle 350. In general, the filter seat 360 is configured to cooperate with the filter cartridge 400 to establish a seal that prevents, or at least substantially prevents, fluid in the unfiltered water reservoir 300 from bypassing the filter cartridge 400. With more particular reference to its configuration, the example filter seat 360 is angled, relative to vertical, and terminates in an annular shoulder 362 that serves to limit the extent to which the filter cartridge 400 can be inserted into the tubular portion 352 of the candle 350.

Figure 4:
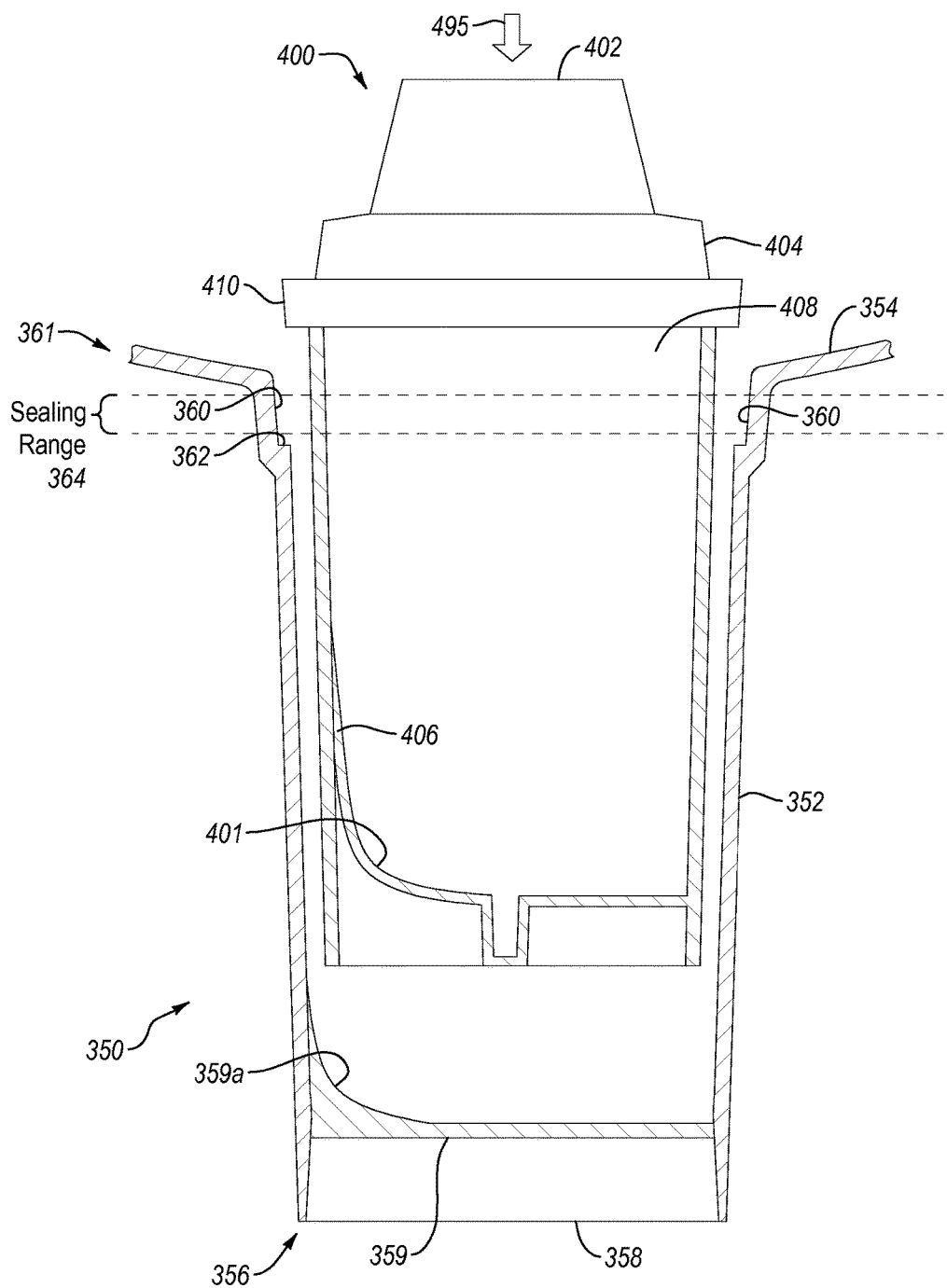
FIG. 4 is a cutaway view disclosing an example filter cartridge and candle of an untreated water reservoir.

With continued reference now to FIG. 4 in particular, details are provided concerning the example filter cartridge 400. As shown, the filter cartridge 400 includes a top 402 that, as illustrated in the example of FIG. 2, interfaces with a filter management element (not shown) in order to promote proper seating of the filter cartridge 400 in the candle 350. The filter cartridge 400 also includes a fluid inlet section 404 comprising one or more inlet ports that enable fluid from the untreated water reservoir 300 to enter the filter cartridge 400 and pass into a media chamber 406 having an interior 408 that contains filtration media (not shown).

As discussed in more detail below, the filter cartridge 400 includes an annular sealing surface 410 which, in general, can be formed on the periphery of the filter cartridge 400. Thus, the position and orientation of the sealing surface 410 disclosed in FIG. 4 are provided by way of example only.

With more particular reference to the formation of the seal between the filter seat 360 and the filter cartridge 400, the configuration of the sealing surface 410 of the filter cartridge 400 and/or the configuration of the filter seat 360 can be such that the filter cartridge 400 can be acceptably sealed anywhere within a range of vertical positions of the sealing surface 410 relative to the filter seat 360.

That is, a sealing range 364 can be defined within which the sealing surface 410 and filter seat 360 cooperate to provide a seal adequate to prevent, or substantially prevent, water from bypassing the filter cartridge 400 when the filter cartridge 400 is properly positioned within the candle 350. Formation of an adequate seal between the sealing surface 410 and the filter seat 360 may be further facilitated by forming the sealing surface 410 and filter seat 360 at respective angles, which may or may not be the same, relative to vertical, and/or by constructing one or both of the sealing surface 410 and the filter seat 360 of a material, such as plastic, that is sufficiently compliant to permit some elastic deformation of one or both of the sealing surface 410 and the filter seat 360. Depending upon variables such as, but not limited to, the angle and vertical dimension of the sealing surface 410 of the filter cartridge 400, and the angle and vertical dimension of the filter seat 360, the length of the sealing range 364 can vary.

As well, where a seal is intended to be achieved by forming the sealing surface 410 and filter seat 360 at respective angles, the amount of contact area between those two elements can be controlled by selection of the respective angles, if one or both of those elements are compliant. To some extent at least, a relatively larger contact area may correspond to a relatively better and more stable seal than would be provided by a relatively smaller contact area.

C. Filter Management Elements—Example Embodiments

It will be appreciated from the preceding discussion that the filter management element 200a, and the other example embodiments of the filter management element discussed below, are example structural implementations of a means for performing any one or more of seating a filter cartridge within a sealing range, aligning a filter cartridge with a receptacle, and retaining the filter cartridge within a sealing range. The structures disclosed herein are provided only by way of example and any other structure(s) capable of the same, or comparable, functionality are likewise considered to fall within the scope of the invention. Moreover, any additional, or alternative functions disclosed herein in association with one or more embodiments of a filter management element can likewise be performed by such a means and, as such, the means is not limited to the function of seating a filter cartridge within a sealing range, aligning a filter cartridge with a receptacle, and/or retaining a filter cartridge within a sealing range.

In general, embodiments of a filter management element can be configured, oriented, and located in any fashion that enables implementation of the functionality disclosed herein. Some embodiments of a filter management element are configured to be removably connected to an element of a water pitcher, such as a cover for example, by way of structures such as snaps, tabs, and/or detents for example. As a result of this construction, a filter management element can be removed and replaced by a user. This may be desirable if, for example, the filter management element becomes damaged, or if a filter management element of a different configuration is better suited for use with the filter cartridge expected to be employed. As the foregoing thus suggests then, at least some embodiments of a filter management element can be manipulated by a user while other embodiments of a filter management element, such as those disclosed in FIGS. 10a-10c generally cannot.

In at least some instances, one or more aspects of the physical configuration of a filter management element may be determined based upon the physical configuration of the filter(s) in connection with which the filter management element is expected to be utilized. For example, one consideration that can bear significantly on the design of a filter management element is the fact that many filter cartridges include one or more air vents on the uppermost part of the filter cartridge. In brief, the air vents allow air to escape from the filter cartridge so that water can enter the filter cartridge. If airflow from the vents is impaired, the filter cartridge can become air locked such that little or no water may be able to enter the filter cartridge, thus impairing flow through the filter cartridge and, correspondingly, impairing filtration. Accordingly, various embodiments of the filter management elements disclosed herein are configured to avoid, or at least substantially avoid, blockages of the filter cartridge air vents. This can be achieved, for example, by way of a reduced contact footprint of the filter management element, examples of which are discussed below.

In terms of their overall composition, the filter management elements disclosed herein can be made of any suitable materials, examples of which include, glass, plastic, elastomeric materials such as rubber, ceramic, composites, and metal, or any group of one or more of those. Filter management elements can be molded, or produced by any other suitable process(es). As well, the filter management elements need not take any particular configuration, orientation, or location.

Figure 5:
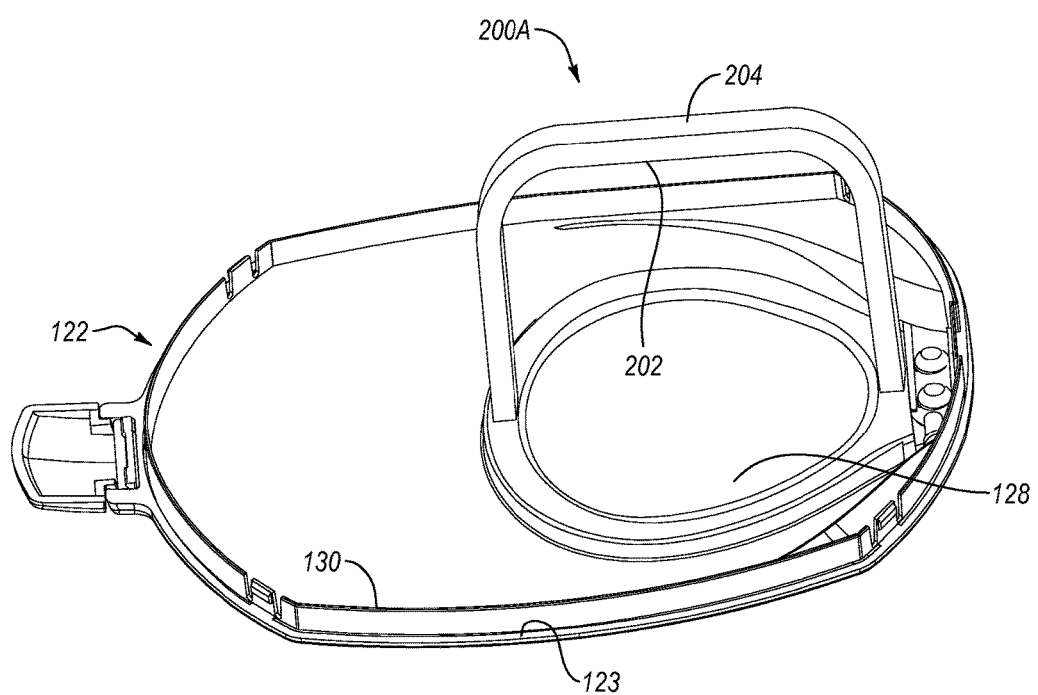
FIG. 5 is a view of an inverted cover that includes an example filter management element.

With particular attention now to FIG. 5, and directing continued attention to FIG. 2, details are provided concerning the example filter management element 200a. In the example of FIG. 5, the filter management element 200a is part of, or attached to, the underside of cover 122 and straddles a fill opening 128. The fill opening 128 can be employed by a user to introduce water into the untreated water reservoir 112 when a rim 130 of the cover 122 is positioned inside the inner perimeter of the chassis 102 and the lid 124 is open.

In the example of FIG. 5, the filter management element 200a has generally U-shaped configuration, and has a generally T-shaped cross-section in which the cross-piece of the T is denoted at 202, and the leg extending below the cross-piece is denoted at 204. The filter management element 200a is connected to the underside of the cover 122 at multiple points, as indicated. Thus configured and arranged, the contact area or contact point on the filter management element 200a that contacts the top 113a of the filter cartridge 113 may include the tip or point of the T-shaped cross-section. In one embodiment, the footprint of the contact area of the protrusion matches a recessed footprint of a corresponding contact area located on the top portion of the filter cartridge. This ensures that the user will be made aware if the filter cartridge is not properly rotationally aligned with the candle.

Figure 6A:
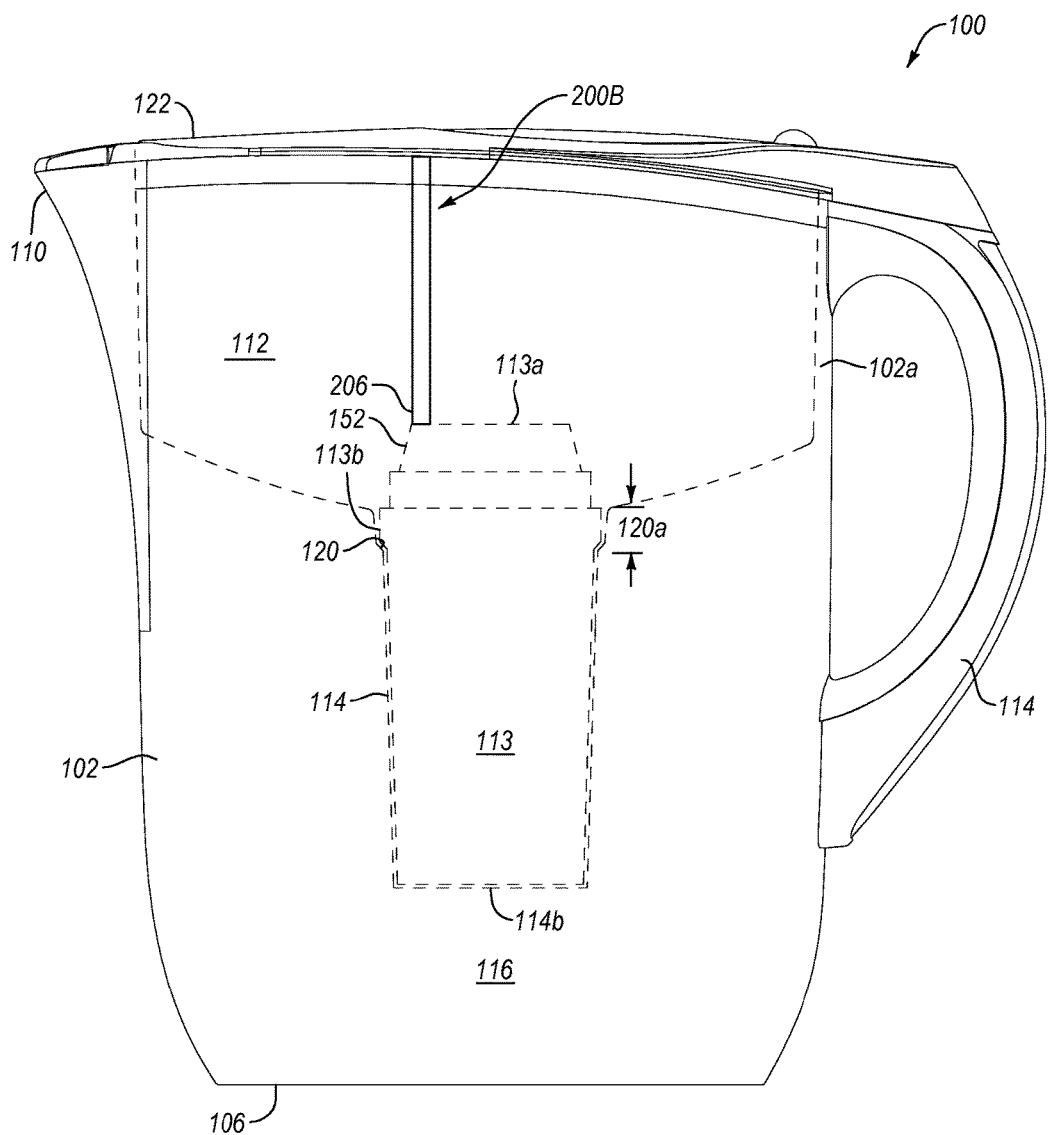
FIG. 6a is a cutaway view of an example pitcher that includes another example filter management element.
Figure 6B:
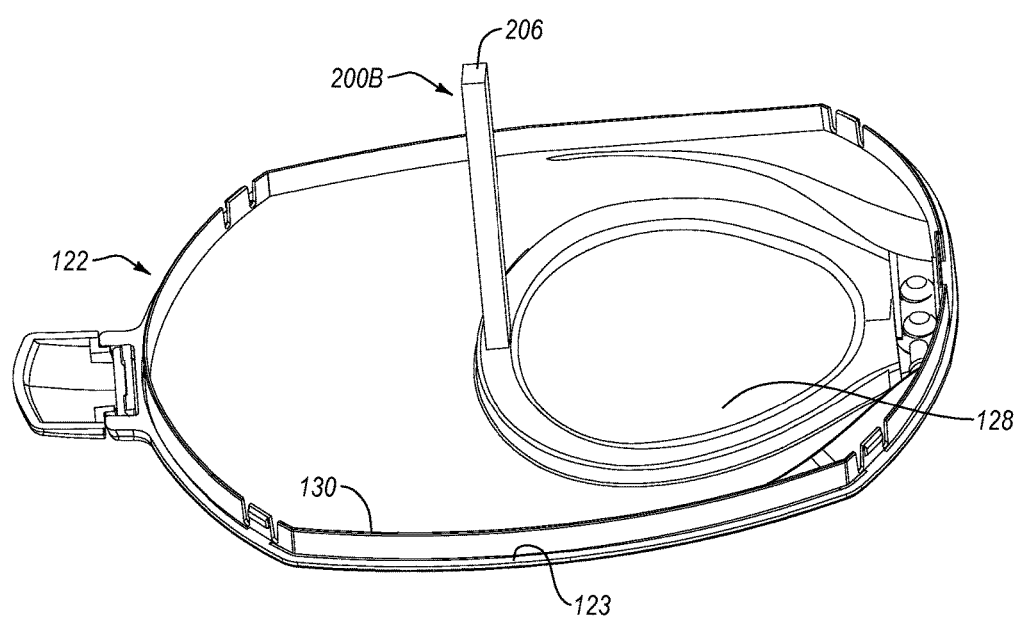

As noted above, the filter management element 200a illustrated in FIGS. 2 and 5 is merely exemplary of a filter management element according to the present disclosure. FIGS. 6a and 6b, for instance, illustrate a filter management element 200b according to another example embodiment of the present disclosure. In the example of FIGS. 6a and 6b, the filter management element 200b is part of, or attached to, the underside of cover 122. The filter management element 200b of FIGS. 6a and 6b has a generally straight configuration and is connected to the underside of the cover 122 at a single location adjacent the fill opening 128, as indicated. Other embodiments of a filter management element may have a curved or other non-straight configuration and/or may be oriented at a non-vertical angle. Similarly, other embodiments of a filter management element may be connected to the cover 122 at one or more locations adjacent to or away from the fill opening 128.

In any event, the contact area or contact point on the filter management element 200b that contacts the top 113a of the filter cartridge 113 may include the tip or end 206 of the filter management element 200b opposite the cover 122. As with the embodiment illustrated in FIGS. 2 and 5, the footprint of the contact area of the protrusion may match a recessed footprint of a corresponding contact area located on the top portion of the filter cartridge. This ensures that the user will be made aware if the filter cartridge is not properly rotationally aligned with the candle.

Figure 7A:
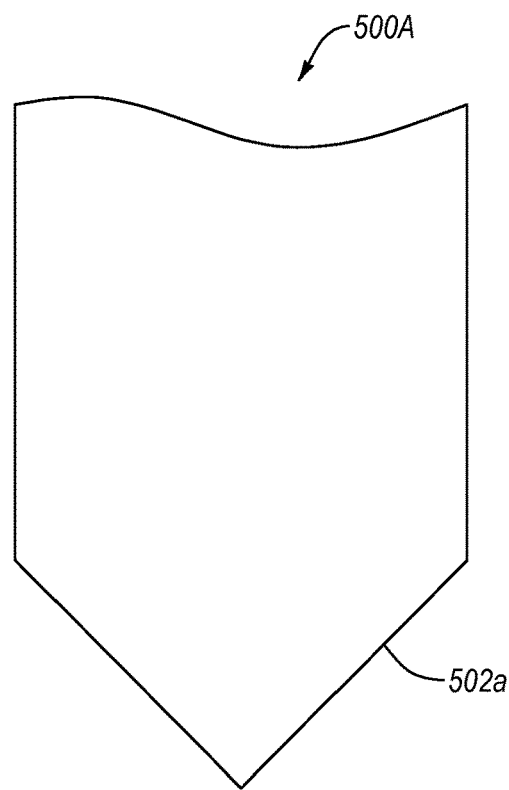
FIG. 7a is a cross-section view of a contact portion of an example filter management element.
Figure 7B:
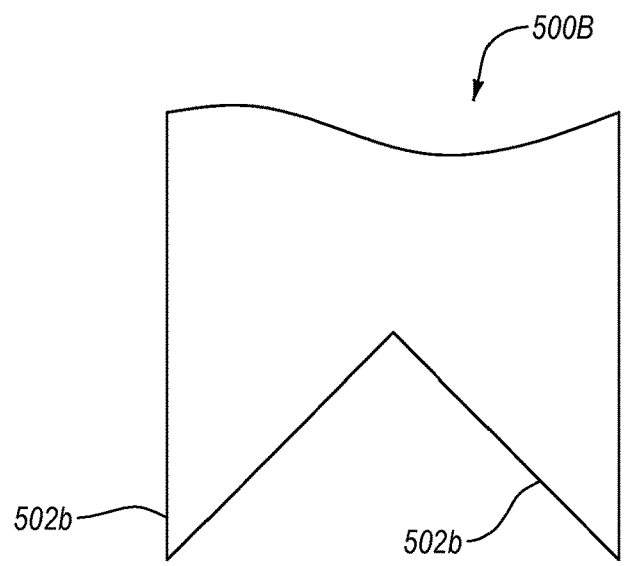
FIG. 7b is a cross-section view of a contact portion of another example filter management element.

Directing attention now to FIGS. 7a-7c, details are provided concerning some aspects of various embodiments of filter management elements configured to avoid, or at least substantially avoid, blockage of filter cartridge air vents. In general, this result can be achieved by the positioning and/or configuration of the filter management element relative to the filter cartridge, or filter cartridges, with which the filter management element is expected to be employed. At least some embodiments of the filter management element are compatible for use with multiple different filter cartridge configurations, examples of which are disclosed in FIGS. 11a-11f below.

While particular filter management element configurations and contact positions are disclosed in the Figures, those are provided solely by way of example. More generally, various embodiments of a filter management element can contact a filter cartridge at any one or more locations of the filter management element and/or filter cartridge that enable filter seating functionality to be performed while substantially avoiding impairment of air flow from the filter cartridge. As noted elsewhere herein, yet other embodiments of a filter management element need not contact the filter cartridge, or contact the filter cartridge only at certain times, but not at others.

In FIGS. 7a and 7b, example cross-sectional shapes of a filter management element 500A and 500b, respectively, are disclosed. In this example, the contact portion 502a, that is, the portion of the cross section that contacts the top of the filter cartridge (not shown), is tapered. As a result of this tapered configuration, the contact area between the filter management element 500a and the filter cartridge can be relatively small, thus helping to ensure that airflow from the filter cartridge is not materially impaired. Moreover, the upward slope of the contact portion 502a away from the air vents also helps to avoid adverse impact on air flow when the contact portion 502a is positioned on top of the filter cartridge.

The concept behind the filter management element 500B in FIG. 7b is the same as for filter management element 500A, although the implementation is different. In the example of FIG. 7b, the contact portion 502b has a shape that is generally the inverse of the shape of contact portion 502a. As well, the contact portion 502b has multiple contact points configured and arranged to make contact with a portion, such as the top, of a filter cartridge.

These different two shapes may be respectively referred to as male, and female, configurations. In general, while both contact portions 502a and 502b are indicated as having one or more tapered portions, one or more of those tapered portions can instead be rounded, pointed, curved or relatively flat, for example, at least to an extent that air flow from the filter cartridge is not materially impaired. Moreover, portions of the filter management elements 500a and 500b that do not contact a filter cartridge can be any desired shape. Thus, a filter management element may, but is not required to, have a substantially uniform cross-sectional shape throughout its entire length.

As in the case of the contact portion 502a, the contact portion 502b, which includes two, or more, points of contact, is configured such that the contact area between the filter management element 500b and the filter cartridge will be relatively small, thus helping to ensure that airflow from the filter cartridge is not materially impaired. Moreover, the upward slope of the middle of the contact portion 502b away from the air vents also helps to avoid adverse impact on air flow when the contact portion 502b is positioned on top of the filter cartridge.

Figure 8A:
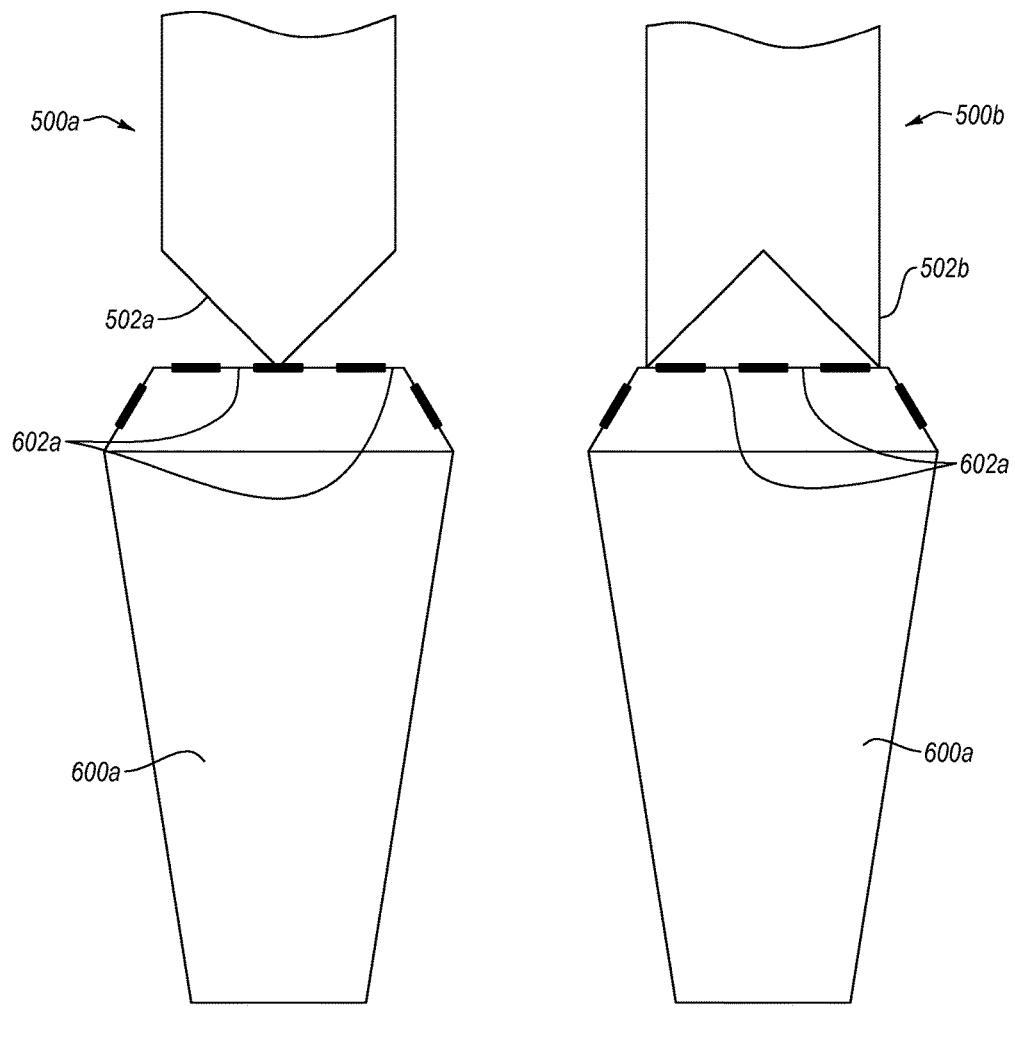
FIGS. 8a-8c are side views of the interaction of various filter management element with various filter cartridge configurations.
Figure 8B:
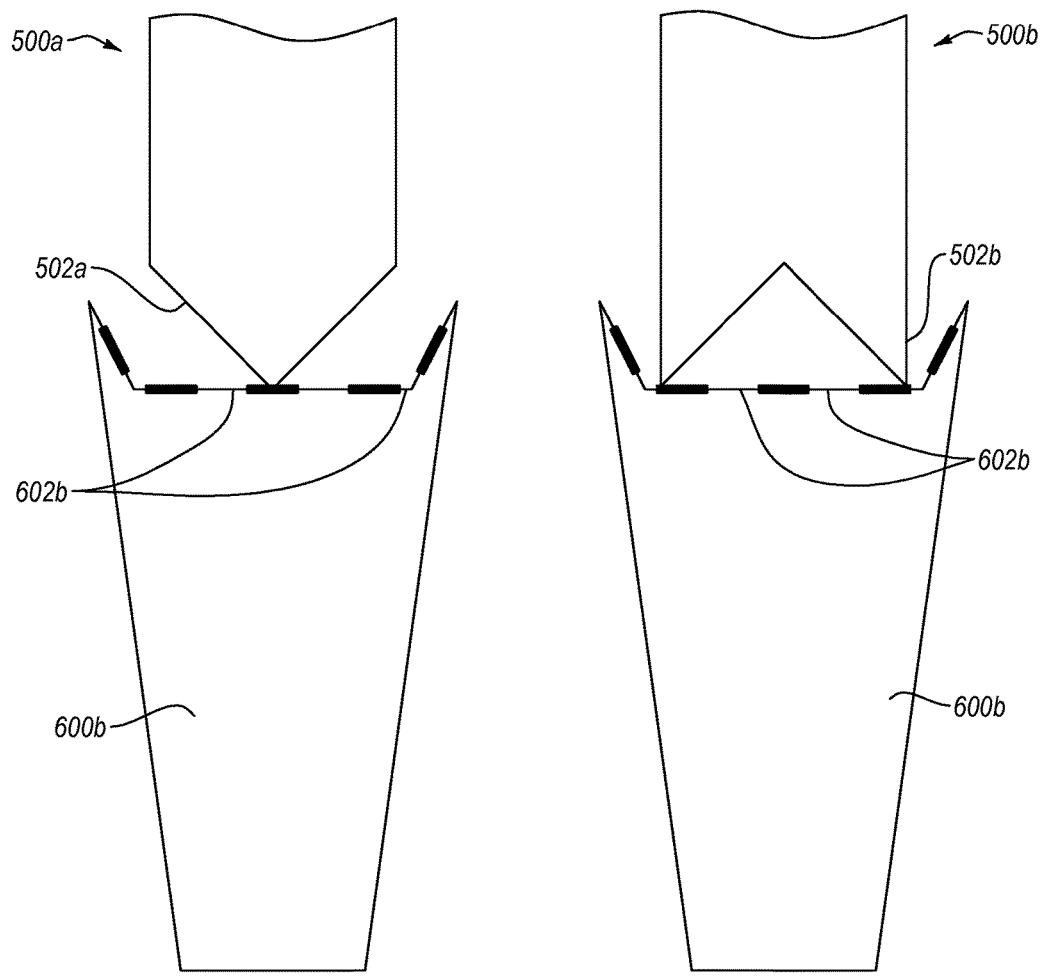
Figure 8C:
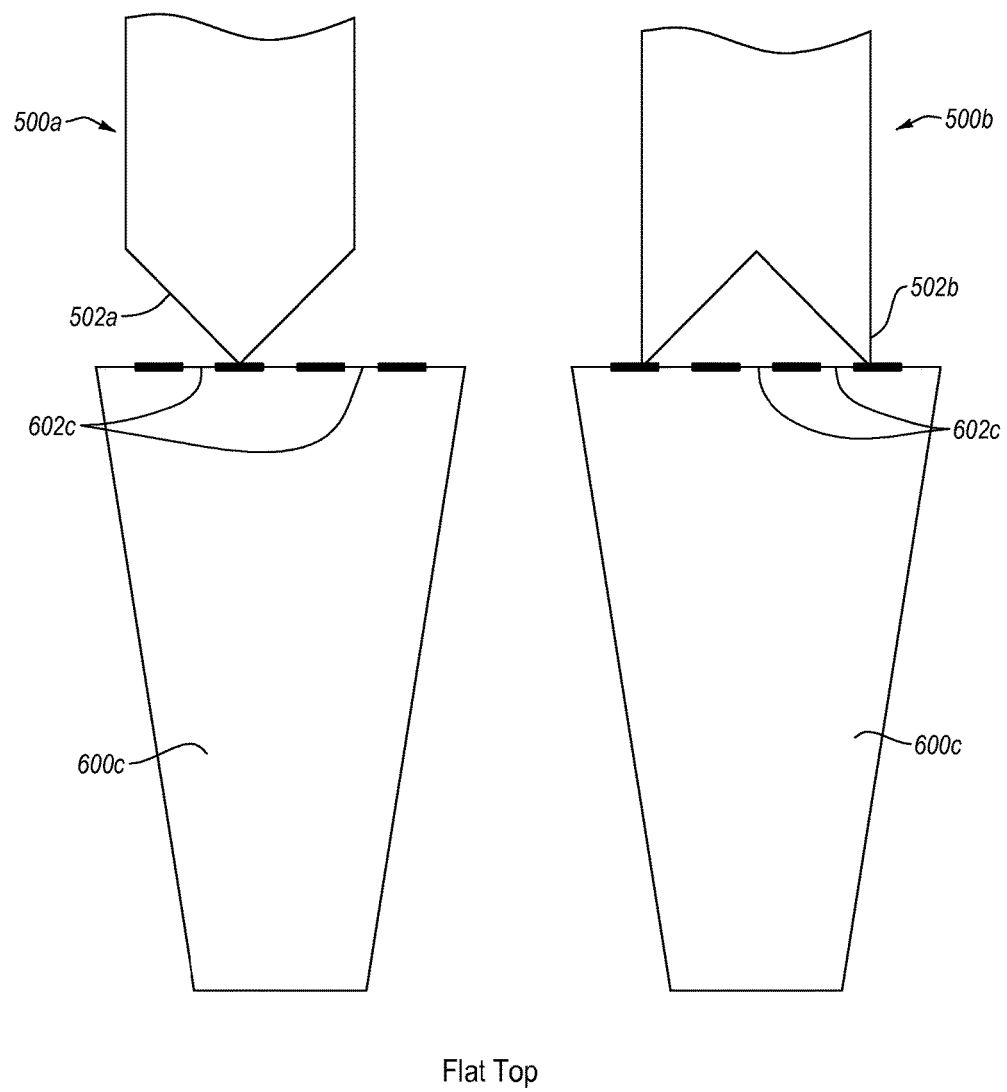

With attention now to FIGS. 8a-8c, details are provided concerning the use of filter management elements such as 500a and 500b in connection with various types of filter cartridge configurations. Among other things, FIGS. 8a-8c illustrate that a single configuration of a filter management element is compatible with multiple filter cartridges, each having a different respective configuration in the region where the filter cartridge is contacted by the filter management element.

In FIG. 8a, a filter cartridge 600a with a convex top is disclosed. The filter cartridge 600a includes a plurality of air vents 602a disposed in various locations on the top of the filter cartridge 600a. However, by virtue of the generally tapered construction of the contact portion 502a of the filter management element 500a, it can be seen in FIG. 8a that the contact portion 502a does not reside on, or block in any way, the air vents 602a. The contact portion 502a can contact the filter cartridge 600a generally in the center of the top of the filter cartridge 600a as generally indicated in FIG. 8a, or the contact portion 502a can contact the filter cartridge 600a at a location that is off center from the top of the filter cartridge 600a.

In FIG. 8b, a filter cartridge 600b with a concave top is disclosed. The filter cartridge 600b includes a plurality of air vents 602b disposed in various locations on the top of the filter cartridge 600b. However, by virtue of the generally tapered construction of the contact portion 502a of the filter management element 500a, it can be seen in FIG. 8b that the contact portion 502a does not reside on, or block in any way, the air vents 602b. The contact portion 502a can contact the filter cartridge 600b generally in the center of the top of the filter cartridge 600a as generally indicated in FIG. 8b, or the contact portion 502a can contact the filter cartridge 600b at a location that is off center from the top of the filter cartridge 600b.

With reference now to FIG. 8c, a filter cartridge 600c with a substantially flat top is disclosed. The filter cartridge 600c includes a plurality of air vents 602c disposed in various locations on the top of the filter cartridge 600c. However, by virtue of the generally tapered construction of the contact portion 502a of the filter management element 500a, it can be seen in FIG. 8c that the contact portion 502a does not reside on, or block in any way, the air vents 602c. The contact portion 502a can contact the filter cartridge 600c generally offset from the center of the top of the filter cartridge 600c as generally indicated in FIG. 8c, or the contact portion 502a can contact the filter cartridge 600c at a location that is substantially centered on the top of the filter cartridge 600c.

Figure 9A:
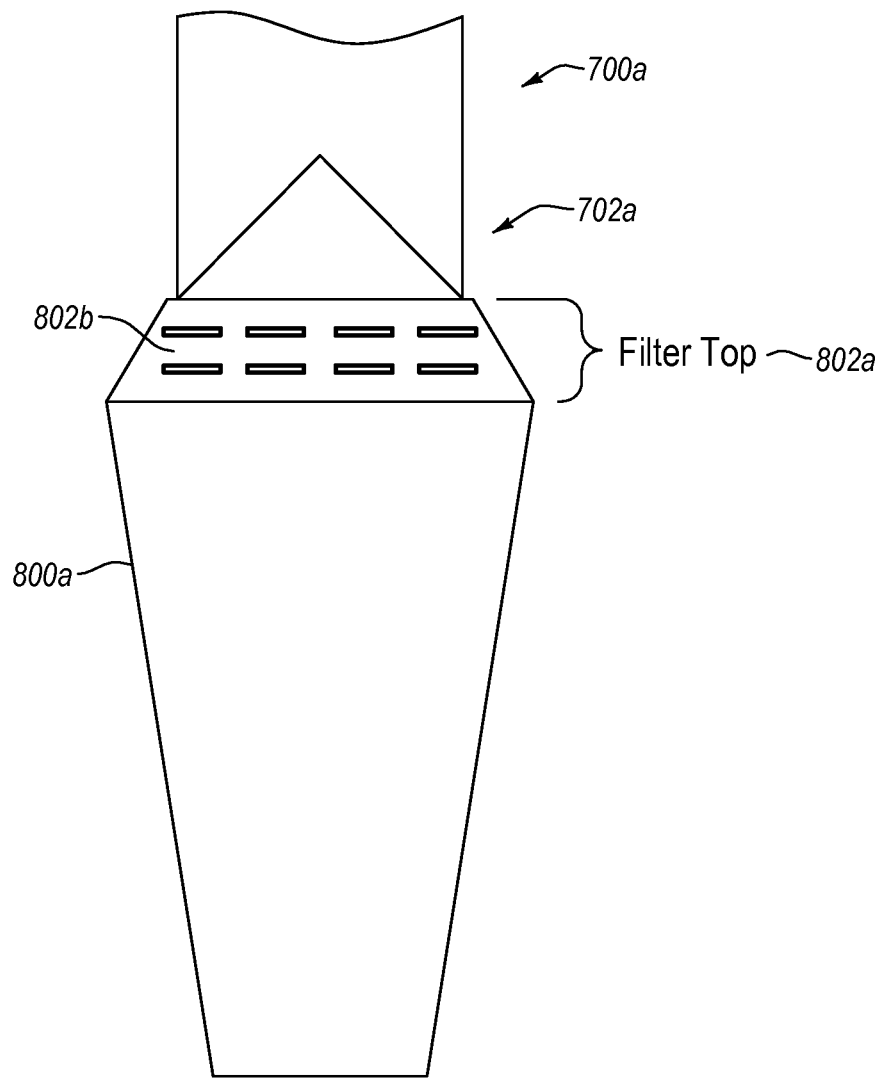
FIGS. 9a-9c are side views of the interaction of still further various filter management element with various filter cartridge configurations.
Figure 9B:
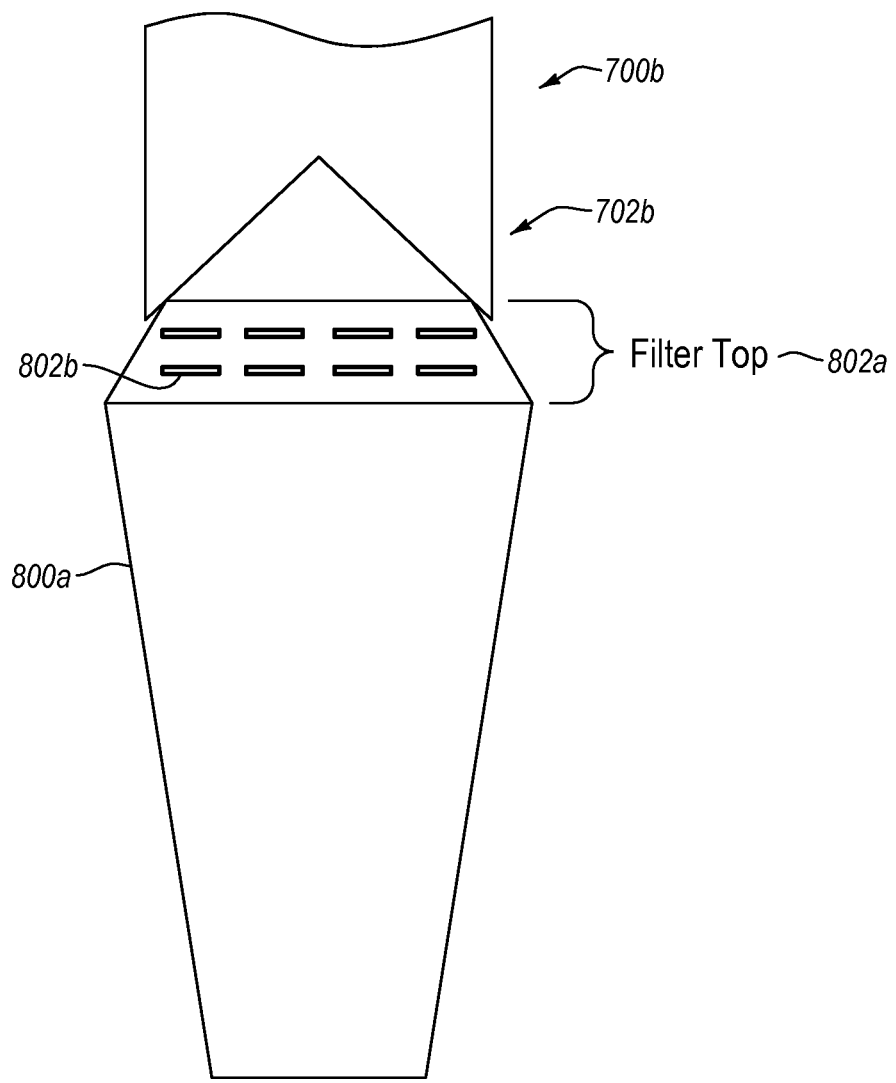
Figure 9C:
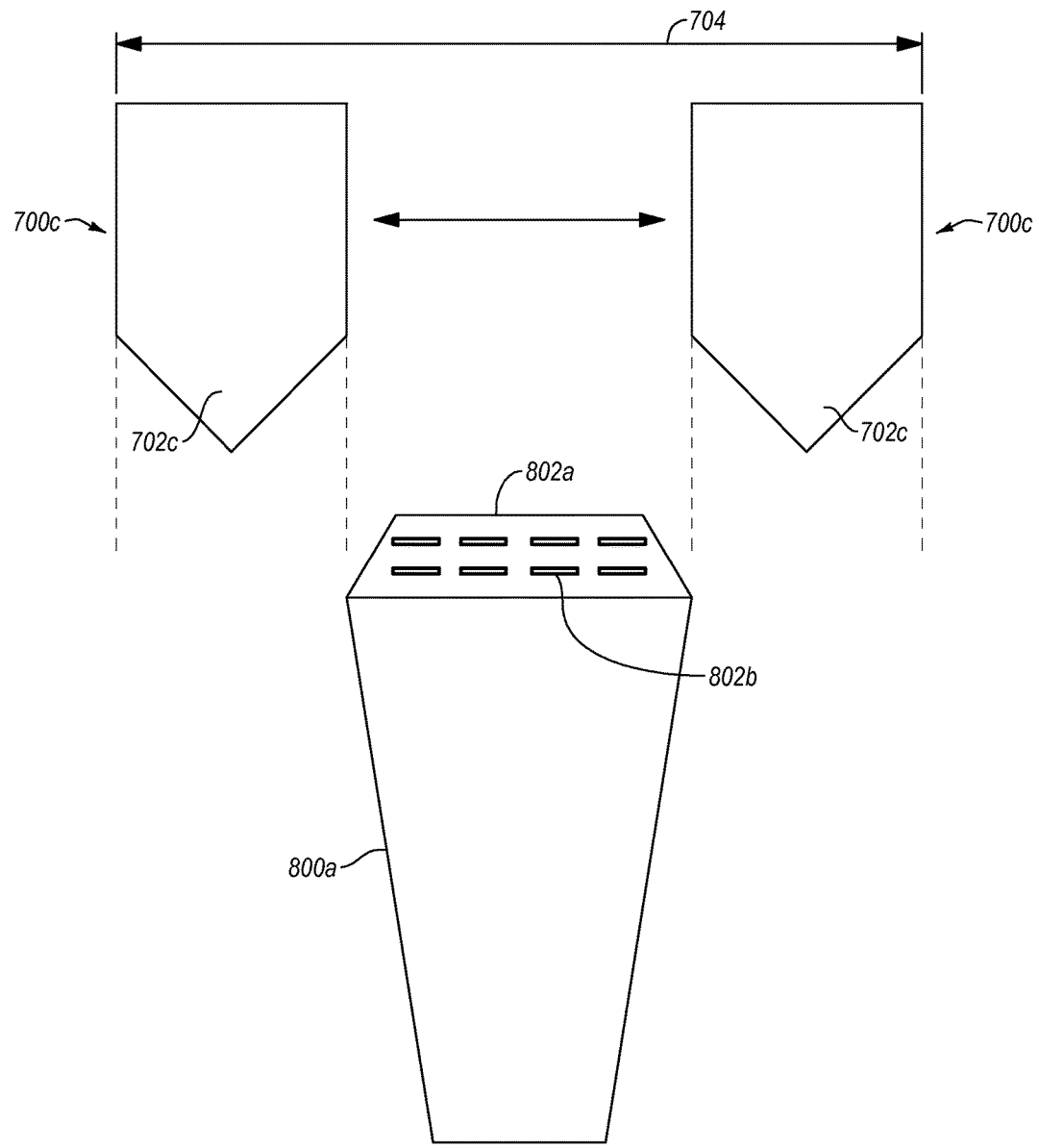

With attention now to FIGS. 9a-9c, details are provided concerning further example embodiments of filter management elements 700a, 700b and 700c. As indicated in FIGS. 9a and 9b, the filter management element 700a has a female configuration that includes a contact portion 702a having multiple contact points. The filter management element 700a can take a variety of configurations, any of which are effective to provide the filter seating functionality disclosed herein, while also avoiding material impairment of airflow from a filter cartridge.

With regard first to FIG. 9a, the filter management element 700a can be used with a variety of filter cartridge configurations, including the convex configuration of the filter cartridge 800a. In this particular example, the contact portion 702a of the filter management element 700a is sized and configured to contact the filter cartridge 800a in at least two locations within an outer perimeter of the filter top 802a. Thus configured and arranged, the filter management element 700a neither blocks the fluid inlet section 802b nor the air vents (not shown) on top of the filter cartridge 800a. The configuration of the filter management element 700b is similar except that the contact portion 702b is sized and configured to contact the filter cartridge 800a in at least two locations outside of an outer perimeter of the filter top 802a. Like the filter management element 700a, the filter management element 700b neither blocks the fluid inlet section 802b nor the air vents (not shown) on top of the filter cartridge 800a.

Turning now to FIG. 9c, a male type filter management element 700c is disclosed that is configured to the filter top 802a of the filter cartridge 800a. As shown, the filter management element 700c may move between left and right positions that define a range 704. As long as the filter management element 700c is positioned within the range 704, contact will be made with the filter top 802a of the filter cartridge 800a, and the filter management element 700c can operate to facilitate movement of the filter cartridge 800a into a sealing range.

D. Alternative Embodiments of Filter Management Elements

Figure 10A:
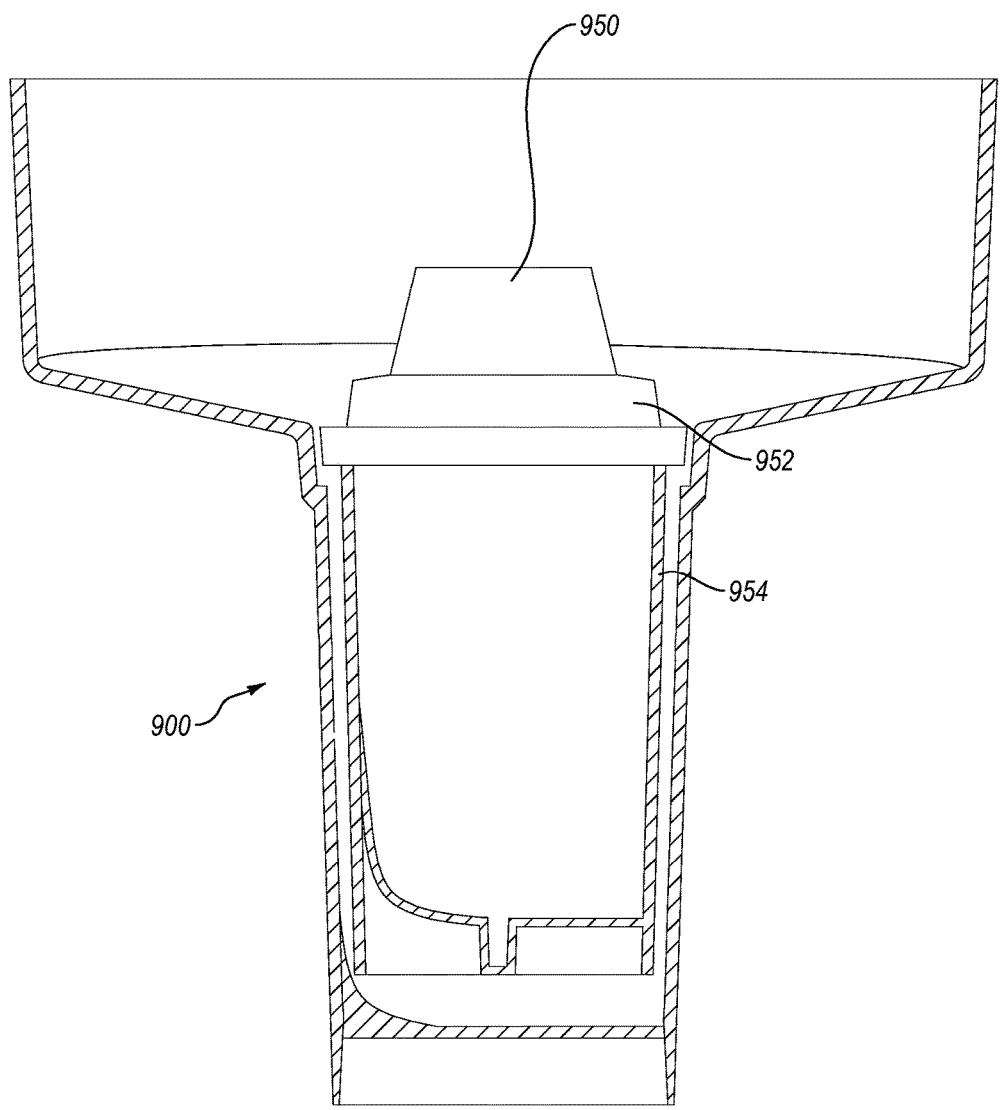
FIGS. 10a-10d are directed to an embodiment of a candle that includes various types of filter management elements.
Figure 10B:
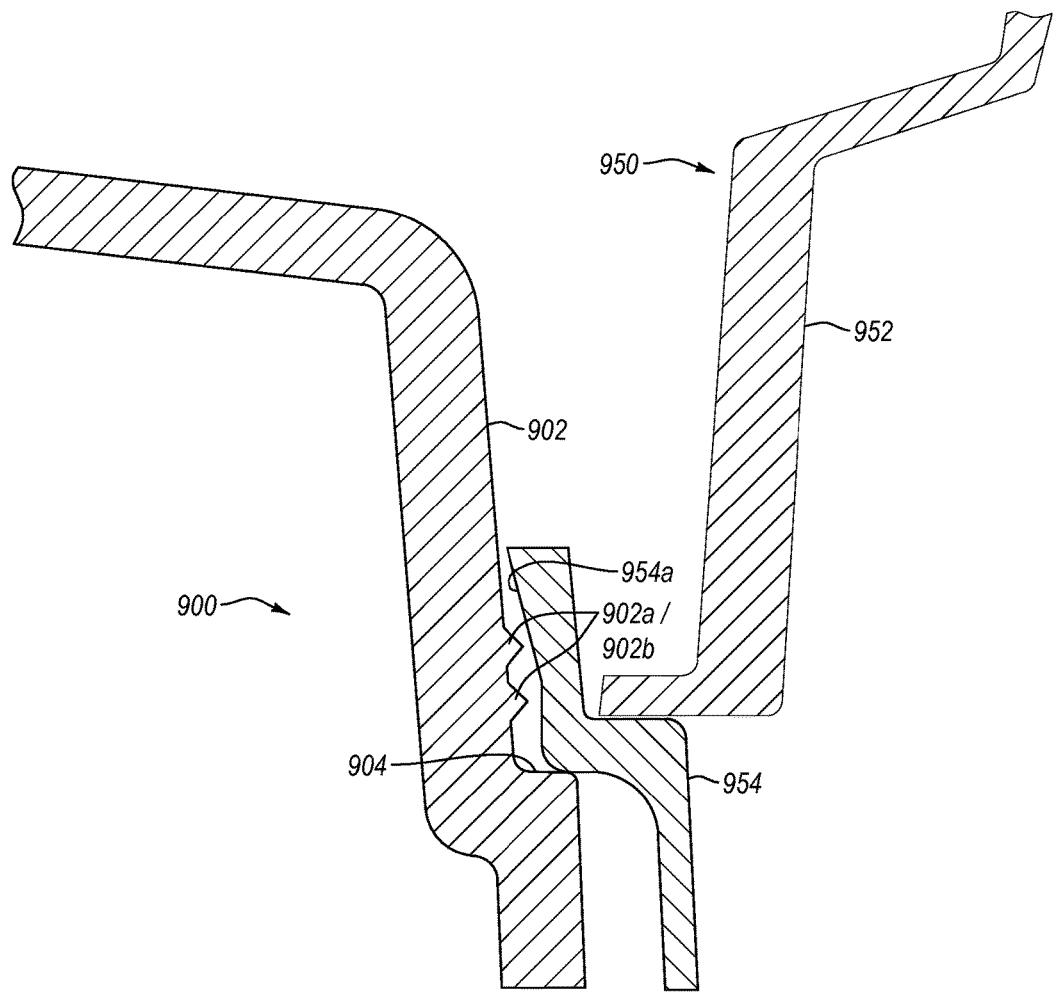
Figure 10C:
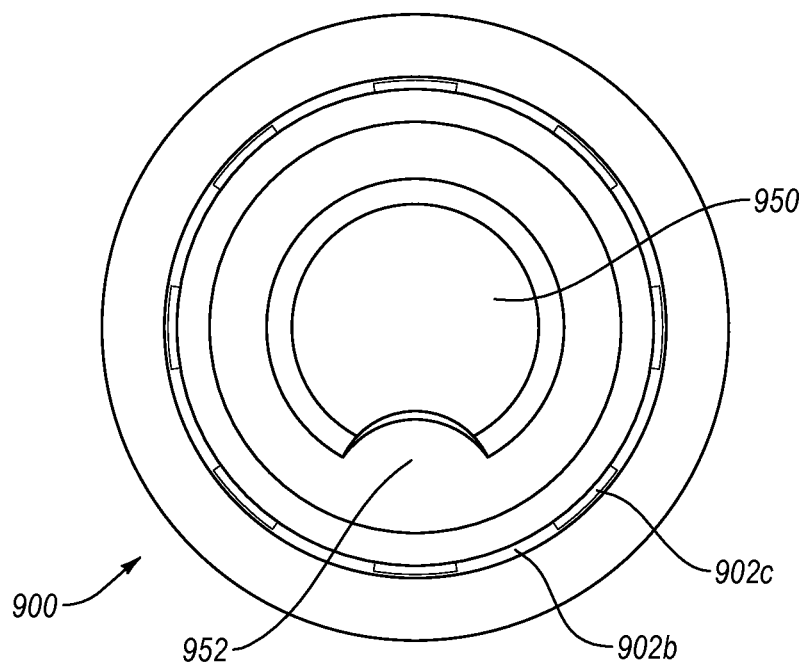

With regard now to FIGS. 10a-10c, details are provided concerning another embodiment of a candle, one example of which is denoted generally at 900 and includes one or more filter management elements. Except as noted below, the candle 900 may be substantially the same, or identical, to other embodiments of a candle disclosed herein. Moreover, the filter management elements employed in the candle 900 can be used either separately, or in conjunction with, any of the filter management elements disclosed herein. As in the case of the other candles disclosed herein, the candle 900 is not limited for use with any specific filter cartridge configuration(s).

Similar to other candles disclosed herein, the candle 900 may include an annular filter seat 902 that may be disposed at an angle relative to vertical. Below the filter seat 902, an annular shoulder 904 is positioned that limits the extent to which a filter cartridge 950 can be moved downward in the candle 900. As best shown in FIGS. 10a and 10b, the filter cartridge 950 includes an upper housing portion 952, and a lower housing portion 954 that can reside on the shoulder 904 of the candle 900. The lower housing portion 954 can cooperate with the filter seat 902 to form a fluid-tight, or substantially fluid-tight, seal in the manner disclosed elsewhere herein.

With continued reference to FIG. 10b in particular, the example lower housing portion 954 may have an inwardly tapering sealing surface 954a. As a result of this configuration, the contact area between the sealing surface 954a and the filter seat 902 may be relatively smaller than in the case of other filter cartridges. While an adequate seal is achievable with this configuration, it may be desirable in some instances to further enhance the seal between the lower housing portion 954 and the filter seat 902.

One way to further enhance the aforementioned seal is to extend at least a portion of the filter seat 902 inward, that is, toward the interior of the candle 900 so that a relatively greater portion of the filter seat 902 is positioned relatively closer to the sealing surface 954a. By extending the filter seat 902 in this way, the contact area between the filter seat 902 and the sealing surface 954a is increased when the lower housing portion 954 is located in a sealing range of the candle 900. In the example of FIG. 10b, this extension of the filter seat 902 is achieved through the use of one or more filter management elements 902a that extend from the filter seat 902 toward the interior of the candle 900. The filter management elements 902a are positioned below the outermost portion of the lower housing portion 954, and above the shoulder 904. One or both of the filter management elements 902a can be disposed within, or at least partly define, the sealing range of the candle 900. In general, the filter management elements 902a may help to improve or enhance a fluid-tight, or substantially fluid-tight, seal formed by the candle 900 in cooperation with the filter cartridge 950. Additionally, or alternatively, the filter management elements 902a, as well as filter management elements 902b, may aid in the retention of the filter cartridge 950 in the sealing range of the candle 900.

In terms of their construction, the filter management elements 902a may each take the form of an annular ring, and can each have a generally triangular cross-section, as shown, although that particular configuration is not required. More generally, any cross-sectional shape can be employed that serves to provide a relative increase in contact area between the filter seat 902 and the sealing surface 954a. Other example shapes include, but are not limited to, the following, or portions thereof, circular, square, oval, polygonal, and rectangular.

Further, the number, size and positioning of the filter management elements 902a are not limited to the illustrated configuration. For example, more, or fewer, than two filter management elements 902a can be employed. As well, the cross-sectional area of the filter management elements 902a can be larger, or smaller, than indicated in FIG. 10b. Further, the size and configuration of the filter management elements 902a need not be the same for each filter management element. That is, one filter management element can differ from another filter management element in terms of their respective sizes and/or shapes.

In addition to providing for a relative increase in contact area between the filter seat 902 and the sealing surface 954a, the use of one or more filter management elements 902a, which can take the form of annular rings as noted above, may also enhance the grip of the filter seat 902 on the lower filter cartridge housing 954. As a result, the filter cartridge housing 950 may be less likely to come loose from the candle 900 during use.

Figure 10D:
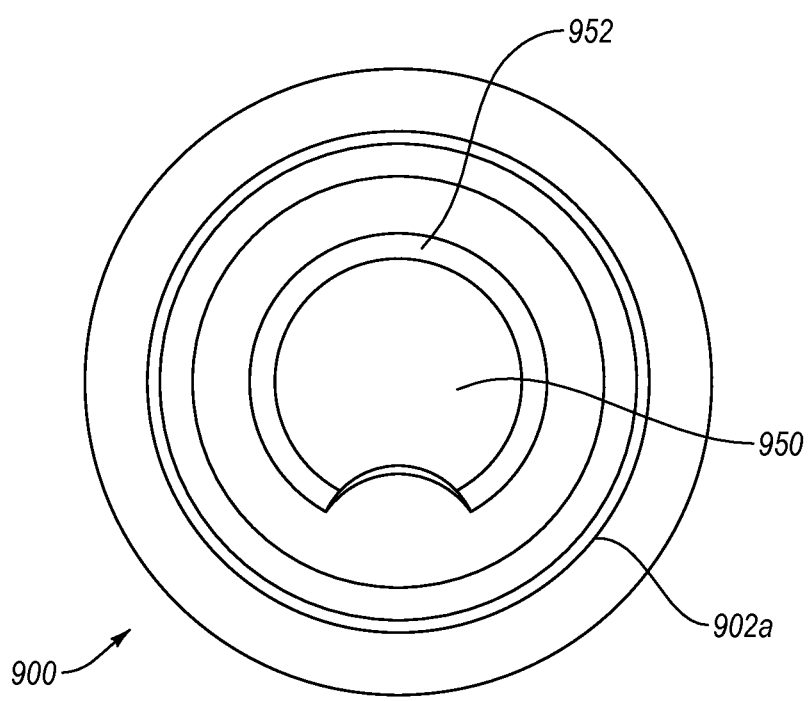
Figure 11A:
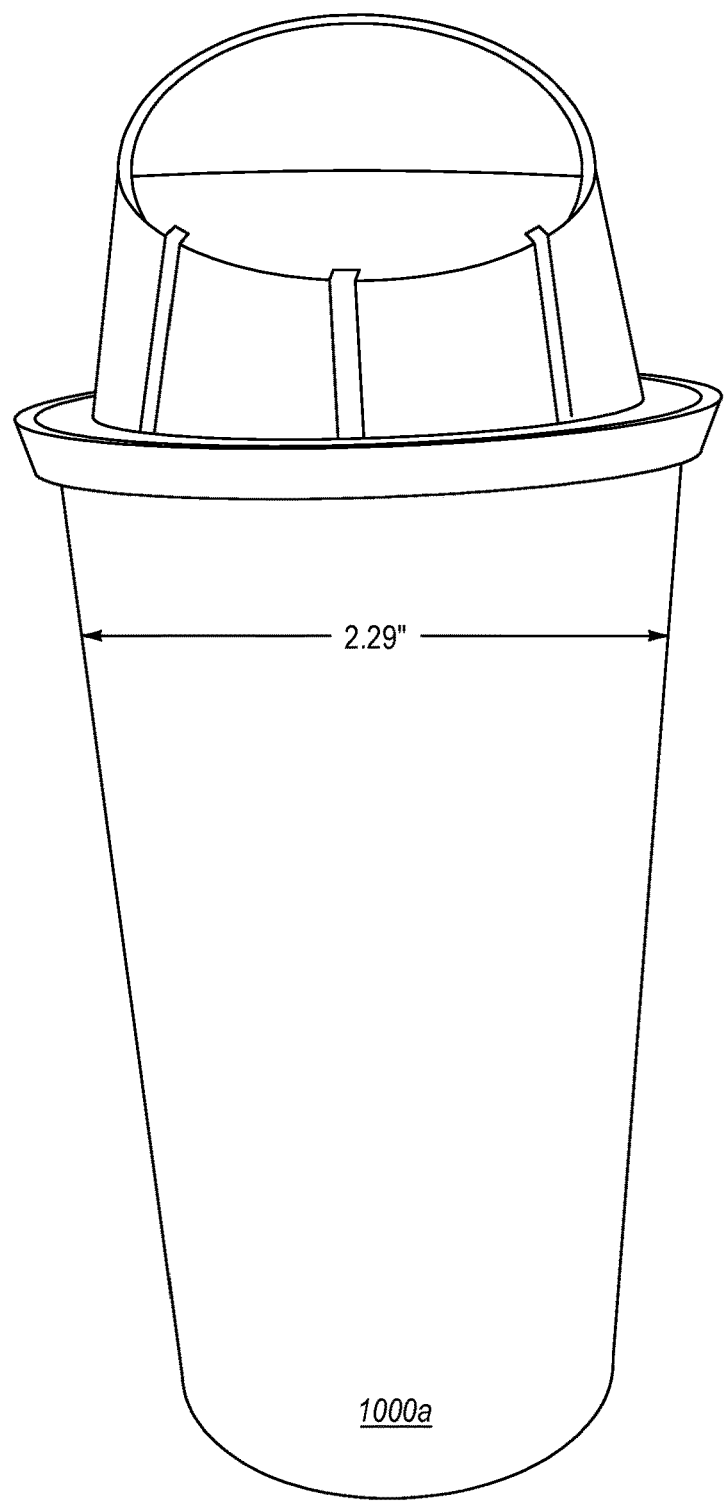
FIGS. 11a-11f are side views of example filter cartridges that can be employed with various embodiments.
Figure 11B:
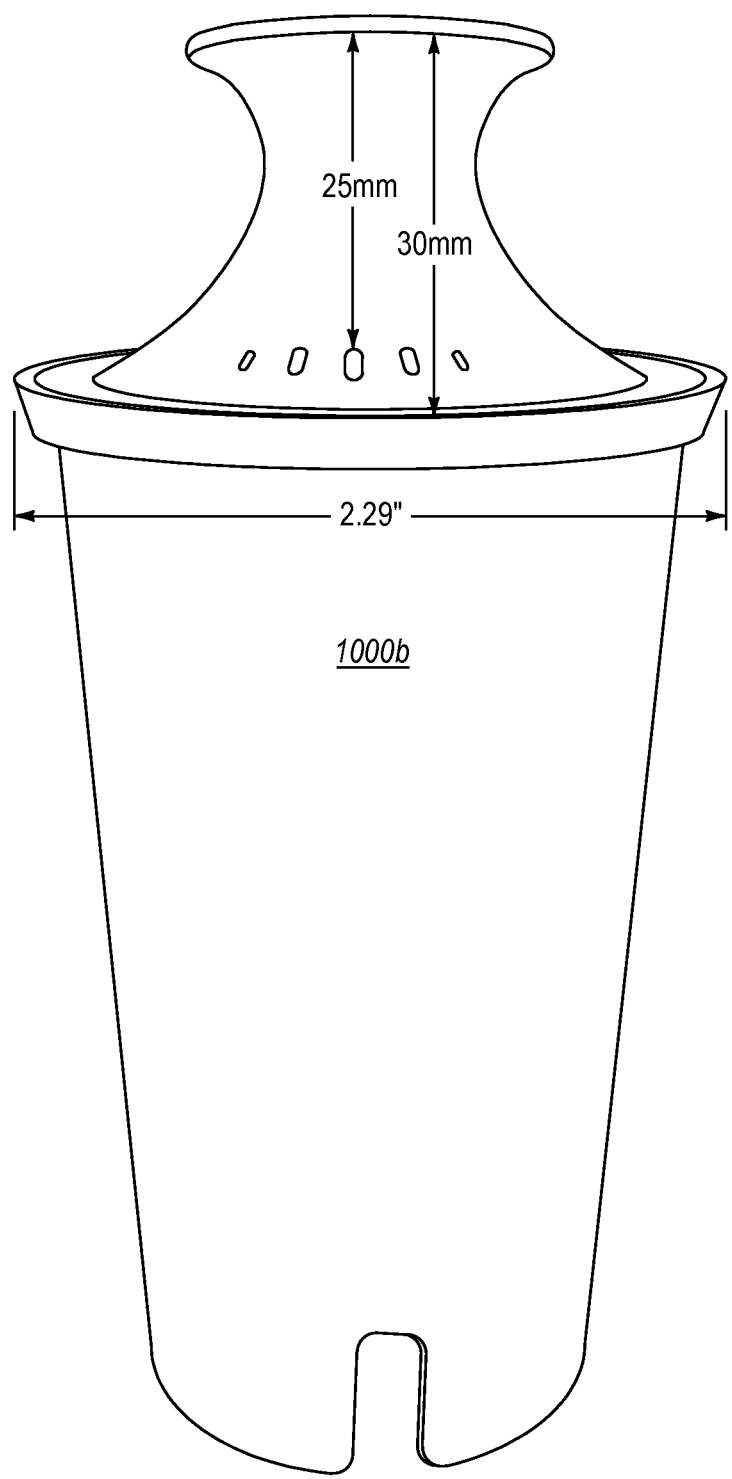
Figure 11C:
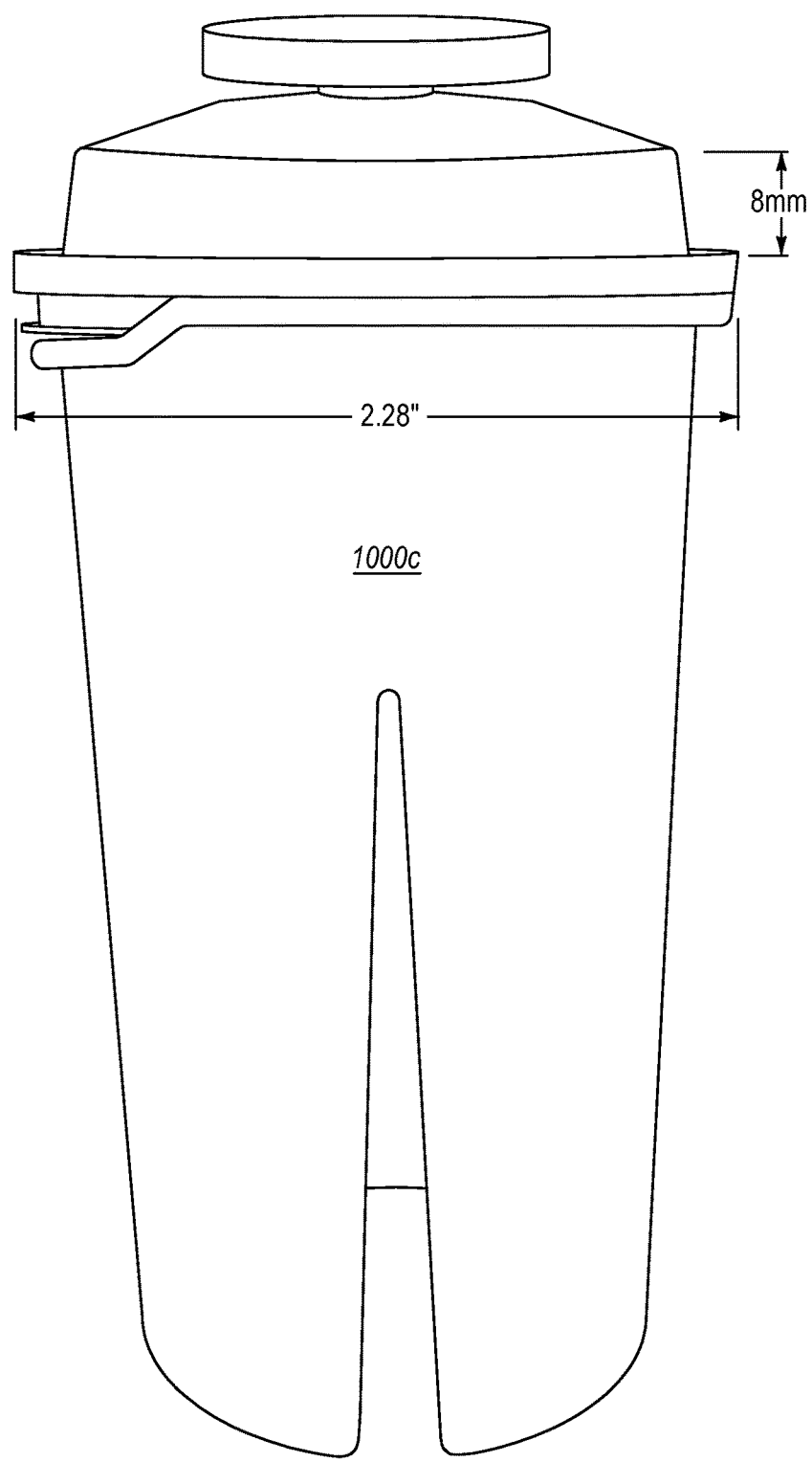
Figure 11D:
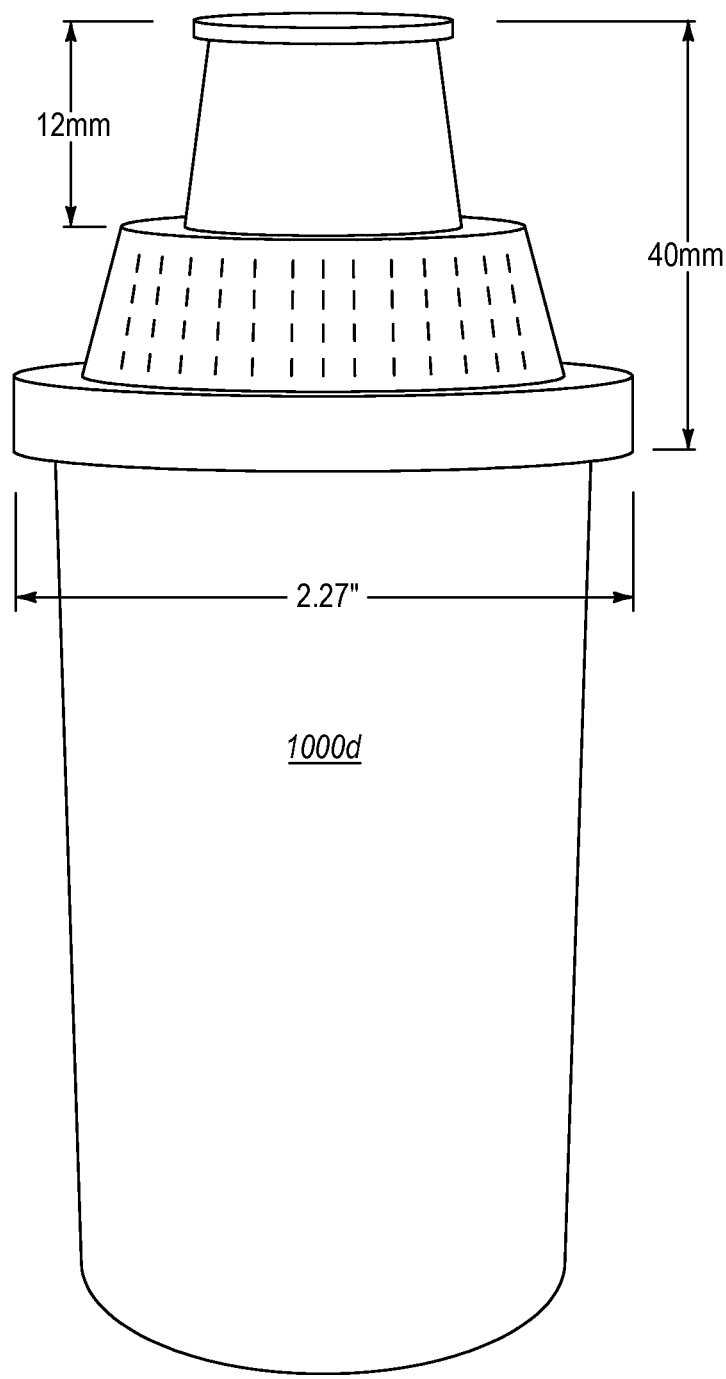
Figure 11E:
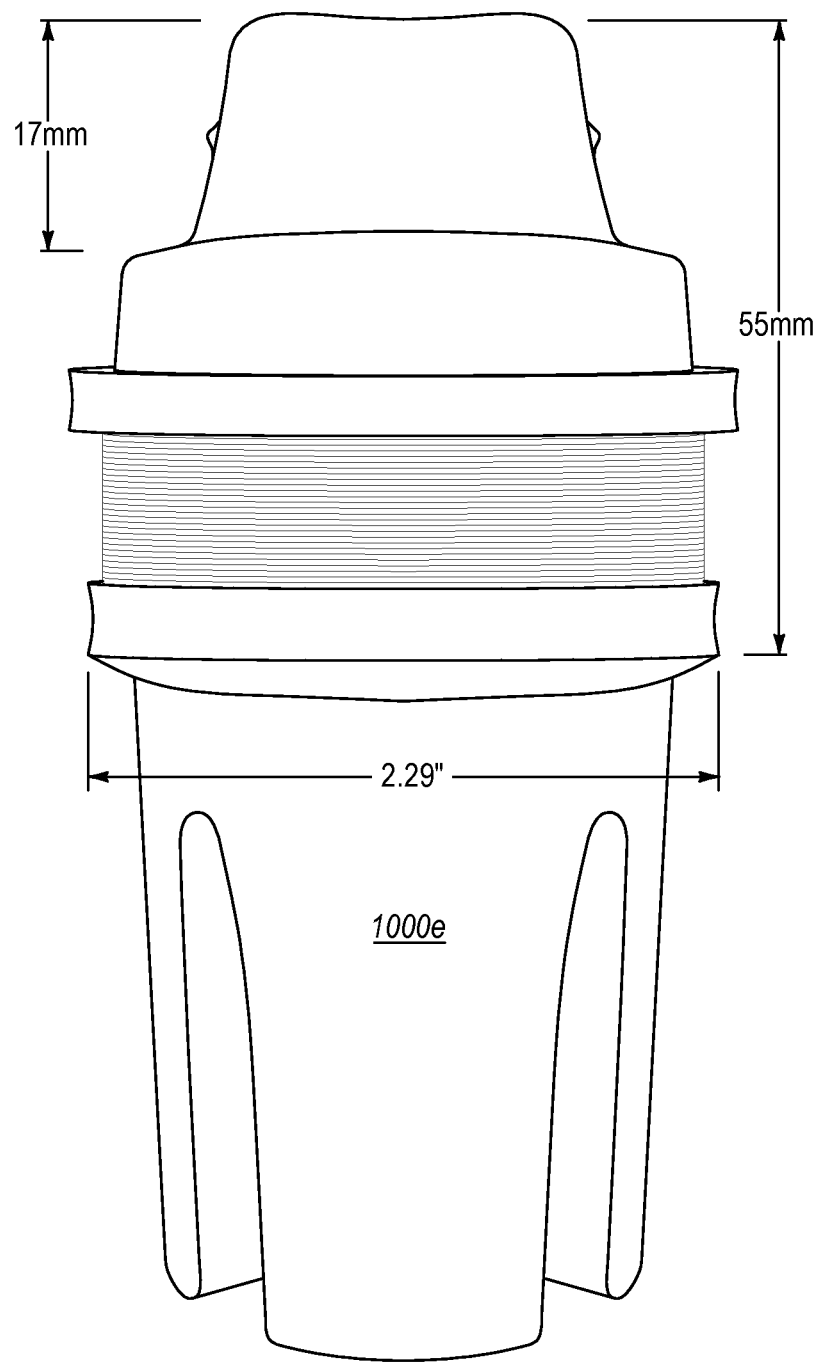
Figure 11F:
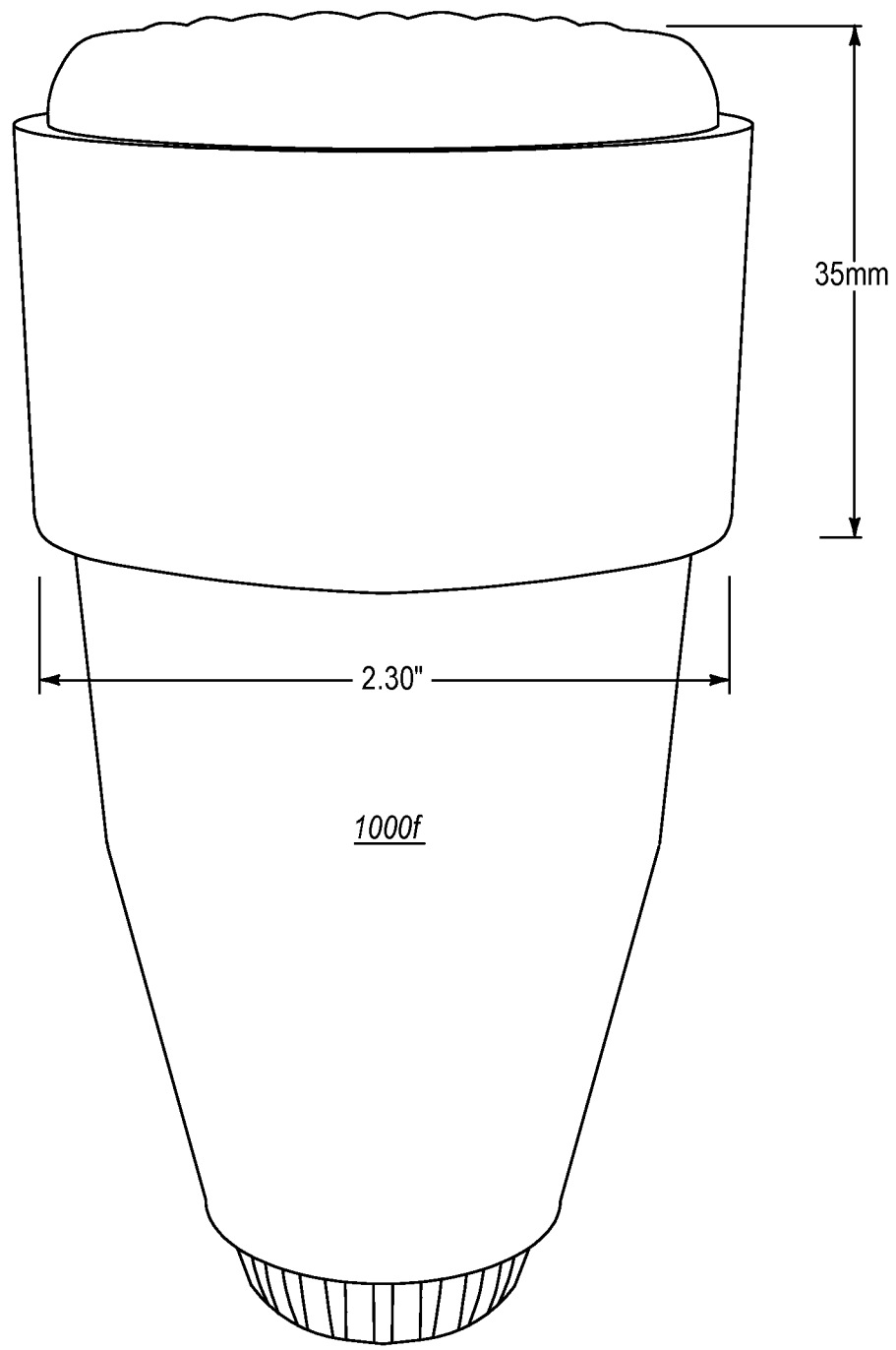

With continued reference to FIGS. 10c and 10d in particular, some embodiments of the candle 900 additionally, or alternatively, include one or more filter management elements 902b. In general, the filter management element(s) 902b may help to improve the grip of the candle 900 on the filter cartridge housing 950 so that the filter cartridge housing 950 is less likely to move out of the sealing range during use.

The filter management elements 902b may be generally annular in their overall configuration while taking the form of a non-continuous ring, that is, a segmented form where gaps 902c are present between successive sections of the filter management element 902b. The size, number and spacing of the gaps 902c can be varied as desired. The gaps 902c may, or may not, be relatively evenly distributed. In terms of their cross-sectional shape and/or size, the segments of the filter management element 902b can be the same as, or similar to, the filter management elements 902a.

One or more filter management elements 902b can be employed in a candle 900 with, or without, one or more filter management elements 902a, in any combination and number. In yet other embodiments, an example of which is disclosed in FIG. 10d, the filter management elements 902b can be omitted, and only one or more filter management elements 902a are employed. As well, any relative position of the filter management elements 902b and filter management elements 902a, when both are present, can be employed. For example, a filter management element 902b can be vertically positioned above, or below, a filter management element 902a. Finally, one or more filter management elements 902b can be positioned within the sealing range, although that is not required.

E. Example Filter Cartridge Configurations

Turning finally to FIGS. 11a-11f, examples of various filter cartridge configurations are disclosed. In particular, at least some embodiments of a filter management element are configured and arranged such that, in operation, those embodiments can effect movement of one or more of the filter cartridges 1000a-1000f into a sealing range of an associated candle. Thus, embodiments of the invention are not constrained for use with any particular filter cartridge configuration(s).

The present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed:
1. A pitcher, comprising:
a container configured to hold a volume of fluid;
a cover configured to assume a fully closed position relative to the container;
a filter cartridge having a height that is substantially greater than a diameter of the filter cartridge;
a candle having a depth that is substantially greater than a diameter of the candle, and the candle defining a receptacle with a fluid inlet and a fluid outlet and configured to removably receive the filter cartridge, and the candle including a filter seat that cooperates with an annular side surface of the filter cartridge to form a substantially fluid-tight seal when the filter cartridge is positioned in a sealing range defined by the candle, wherein the sealing range comprises a plurality of different vertical positions that the filter cartridge can assume without compromising the substantially fluid-tight seal; and
a filter management element residing outside of the candle and configured and arranged so that when the filter cartridge is aligned in the receptacle but resides outside the sealing range, and a downward force is exerted on the filter management element, a corresponding downward force is conveyed to the filter cartridge by way of the filter management element so as to move the filter cartridge into the sealing range, wherein respective portions of the filter management element and the filter cartridge are configured to cooperatively provide a sensory indication to a user when the filter cartridge is not properly rotationally aligned with the candle, and wherein the cover is movable to the fully closed position while the filter management element is in contact with the filter cartridge.

2. The pitcher as recited in claim 1, wherein when the filter cartridge resides in the sealing range, the filter management element is located proximate a portion of the filter cartridge.

3. The pitcher as recited in claim 1, wherein when the substantially fluid tight seal is present, fluid in the candle can exit the fluid outlet only by passing through the filter cartridge.

4. The pitcher as recited in claim 1, wherein the filter management element is in contact with the filter cartridge when the cover is in the fully closed position.

5. The pitcher as recited in claim 1, wherein the filter management element is attached to the cover.

6. The pitcher as recited in claim 1, wherein the filter cartridge includes one or more air vents located proximate the top of the filter cartridge, and the air vents are not blocked by the filter management element.

7. The pitcher as recited in claim 1, wherein an inside diameter of the candle varies over the sealing range.

8. The pitcher as recited in claim 1, wherein the filter management element does not contact the filter cartridge at all times.

9. The pitcher as recited in claim 1, wherein when the cover is in contact with the filter management element, assumption of the fully closed position by the cover serves as a sensory indication to a user that the filter cartridge is properly seated in the candle.

10. The pitcher as recited in claim 1, wherein when the cover is in contact with the filter management element, a failure of the cover to assume the fully closed position serves as a sensory indication to a user that the filter cartridge is not properly seated in the candle.

11. The pitcher as recited in claim 1, wherein when the filter cartridge is not properly seated in the candle, and the cover is in contact with the filter management element, a downward force exerted on the cover to move the cover to the fully closed position moves the filter cartridge into a properly seated position in the candle.

* * * * *